United States Patent
Yamada et al.

(10) Patent No.: US 10,555,317 B2
(45) Date of Patent: Feb. 4, 2020

(54) SELECTIVE CONFIGURATION OF UL/DL INFORMATION BY A BASE STATION APPARATUS

(71) Applicant: Sharp Kabushiki Kaisha, Sakai, Osaka (JP)

(72) Inventors: Ryota Yamada, Sakai (JP); Takashi Yoshimoto, Sakai (JP); Kazuyuki Shimezawa, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 168 days.

(21) Appl. No.: 15/502,073

(22) PCT Filed: Jul. 31, 2015

(86) PCT No.: PCT/JP2015/071781
§ 371 (c)(1),
(2) Date: Feb. 6, 2017

(87) PCT Pub. No.: WO2016/021494
PCT Pub. Date: Feb. 11, 2016

(65) Prior Publication Data
US 2017/0230985 A1  Aug. 10, 2017

(30) Foreign Application Priority Data

Aug. 7, 2014 (JP) ................. 2014-160972

(51) Int. Cl.
*H04W 72/08* (2009.01)
*H04L 5/00* (2006.01)
*H04W 72/04* (2009.01)

(52) U.S. Cl.
CPC ......... *H04W 72/082* (2013.01); *H04L 5/0051* (2013.01); *H04W 72/042* (2013.01)

(58) Field of Classification Search
CPC . H04W 72/082; H04W 72/042; H04W 72/04; H04W 72/08; H04L 5/0051; H04L 5/00
See application file for complete search history.

(56) References Cited

U.S. PATENT DOCUMENTS

| | | | |
|---|---|---|---|
| 2015/0195820 A1* | 7/2015 | Jung | H04W 72/042 370/329 |
| 2017/0005744 A1* | 1/2017 | Li | H04W 72/082 |
| 2017/0126383 A1 | 5/2017 | Yamada et al. | |

FOREIGN PATENT DOCUMENTS

CN  106465475 A  2/2017

OTHER PUBLICATIONS

3GPP TSG-RAN WG1 #77: Remaining aspects of higher-layer signaling for NAICS, May 23, 2014 (Year: 2014).*

(Continued)

*Primary Examiner* — Kyaw Z Soe
(74) *Attorney, Agent, or Firm* — Birch, Stewart, Kolasch & Birch, LLP

(57) ABSTRACT

Technical Problem
To mitigate interference by using effective knowledge or information as to an interference signal.
Solution to Problem
There is provided a base station apparatus including a higher layer which configures, in a terminal apparatus, first interference information used in the terminal apparatus in order to mitigate interference from a cell-specific reference signal and at least one of second interference information used in the terminal apparatus in order to mitigate interference from a downlink shared channel, third interference information used in the terminal apparatus in order to mitigate interference from a downlink control channel, and fourth interference information used in the terminal apparatus in order to mitigate interference from an enhanced downlink shared channel, in which each of the second interference informa- (Continued)

tion, the third interference information, and the fourth interference information is configured only in a case where the first interference information is being configured.

10 Claims, 3 Drawing Sheets

(56) References Cited

OTHER PUBLICATIONS

MediaTek, Renesas Mobile Europe, Broadcom Corporation, "Study on Network-Assisted Interference Cancellation and Suppression for LTE", RP-130404, 3GPP TSG RAN Meeting #59, Vienna, Austria, Feb. 26-Mar. 1, 2013, 7 pgs.
Renesas Mobile Europe Ltd., "Channels of interest for NAICS", R1-131377, 3GPP TSG-RAN WG1 Meeting #72bis, Chicago, USA, Apr. 15-19, 2013, 3 pgs.
Samsung, "Discussion on scenarios and applications of NAICS", R1-131039, 3GPP TSG RAN1 #72bis, Chicago, USA, Apr. 15-19, 2013, 4 pgs.
Intel Corporation, "Discussion on NAICS interference semi-static parameters blind detection and signalling", R4-143034, 3GPP TSG-RAN WG4 Meeting #71, Seoul, Korea, May 19-23, 2014, 6 pages.

\* cited by examiner

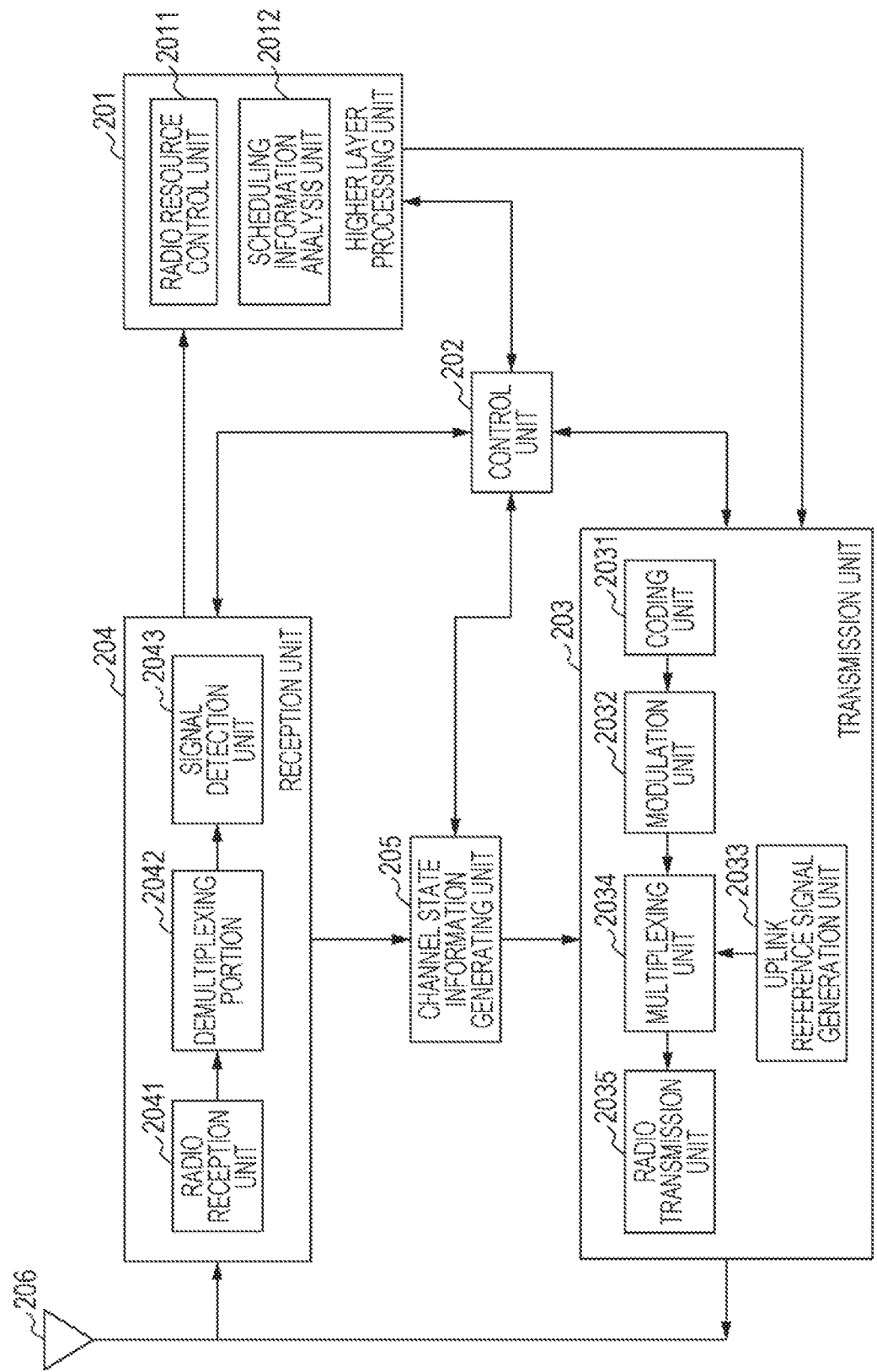

SELECTIVE CONFIGURATION OF UL/DL INFORMATION BY A BASE STATION APPARATUS

TECHNICAL FIELD

The present invention relates to a base station apparatus, a terminal apparatus, and an integrated circuit.

BACKGROUND ART

In a communication system such as Wideband Code Division Multiple Access (WCDMA; registered trademark), long term evolution (LTE), and LTE-advanced (LTE-A) by Third Generation Partnership Project (3GPP) or worldwide interoperability for microwave access (WiMAX), a communication area can be enlarged by using a cellular composition in which a plurality of areas covered by a base station apparatus (a base station, a transmission station, a transmission point, a downlink transmission apparatus, an uplink reception apparatus, a transmit antenna group, a transmit antenna port group, a component carrier, or an eNodeB) or a transmission station corresponding to a base station apparatus is arranged in cells. In the cellular composition, frequency efficiency can be improved by using the same frequency between neighbor cells or sectors.

However, in such a cellular composition, a terminal apparatus (a mobile station apparatus, a reception station, a reception point, an uplink transmission apparatus, a downlink reception apparatus, a mobile terminal, a receive antenna group, a receive antenna port group, or user equipment (UE)) in a cell edge region or a sector edge region receives interference from a transmit signal of a base station apparatus constituting another cell or another sector (inter-cell interference or inter-sector interference), thereby posing a problem in that frequency efficiency is decreased.

As a measure against inter-cell interference or inter-sector interference, the speed of reception performance of the terminal apparatus is increased (advanced receiver). For example, in NPL 1, a minimum mean square error interference rejection combining (MMSE-IRC) receiver, an interference cancellation receiver, an interference suppression receiver, a maximal likelihood detection receiver (MLD receiver), and the like are described as a high speed receiver. Accordingly, limitations from inter-cell interference can be alleviated, and thus improvement in frequency efficiency can be achieved.

In the communication system, spatial multiplexing transmission (multi input multi output (MIMO)) is applied in order to realize efficient data transmission. The high speed receiver is used in order to suppress inter-stream interference (inter-layer interference or inter-antenna interference) generated in spatial multiplexing transmission, and thus improvement in frequency efficiency can be achieved.

CITATION LIST

Non Patent Literature

NPL 1: "Study on Network Assisted Interference Cancellation and Suppression for LTE", 3GPP TSG RAN Meeting #59, RP-130404, March 2013.

SUMMARY OF INVENTION

Technical Problem

The high speed receiver requires knowledge or information related to an interference signal (for example, a parameter for demodulation) in order to mitigate interference. However, the base station apparatus transmitting knowledge or information related to an interference signal to the terminal apparatus poses a problem in that signaling overhead is increased. In addition, if the base station apparatus has less knowledge or information related to an interference signal with respect to the terminal apparatus, the terminal apparatus side is required to estimate information related to an interference signal, thereby posing a problem in that the amount of calculation of the terminal apparatus is increased.

The present invention is conceived in view of such matters, and an object thereof is to provide a base station apparatus, a terminal apparatus, and an integrated circuit that can mitigate interference by using effective knowledge or information related to an interference signal.

Solution to Problem

Composition of a terminal apparatus and an integrated circuit according to the present invention for resolving the above problems is as follows.

A base station apparatus of the present invention is a base station apparatus that communicates with a terminal apparatus, the base station apparatus including a higher layer which configures, in the terminal apparatus, first interference information used in the terminal apparatus in order to mitigate interference from a cell-specific reference signal and/or at least one of second interference information used in the terminal apparatus in order to mitigate interference from a downlink shared channel, third interference information used in the terminal apparatus in order to mitigate interference from a downlink control channel, and fourth interference information used in the terminal apparatus in order to mitigate interference from an enhanced downlink shared channel, in which the first interference information includes one or more pieces of first support information, the second interference information includes one or more pieces of second support information, the third interference information includes one or more pieces of third support information, and the fourth interference information includes one or more pieces of fourth support information.

In the base station apparatus of the present invention, each of the second interference information, the third interference information, and the fourth interference information is configured in a case where the first interference information is being configured.

In the base station apparatus of the present invention, the third interference information is configured only in a case where the second interference information is being configured.

In the base station apparatus of the present invention, the fourth interference information is configured only in a case where the second interference information and the third interference information are being configured.

In the base station apparatus of the present invention, each first support information includes a first cell identifier for the cell-specific reference signal, each second support information includes a second cell identifier for the downlink shared channel, each third support information includes a third cell identifier for the downlink control channel, and each fourth support information includes a fourth cell identifier for the enhanced downlink control channel.

In the base station apparatus of the present invention, the first support information, the second support information, the third support information, and the fourth support information are associated with support information that includes a cell identifier having an identical value as a cell identifier included in each of the first support information, the second support information, the third support information, and the fourth support information.

In the base station apparatus of the present invention, the first interference information is not configured concurrently with any of the second interference information, the third interference information, and the fourth interference information.

In the base station apparatus of the present invention, the second interference information, the third interference information, and the fourth interference information include at least a part of the first interference information.

In the base station apparatus of the present invention, the third interference information and the fourth interference information include at least a part of the first interference information and the second interference information.

In the base station apparatus of the present invention, the fourth interference information includes at least a part of the first interference information, the second interference information, and the third interference information.

A terminal apparatus of the present invention is a terminal apparatus that communicates with a base station apparatus, the terminal apparatus including a higher layer in which first interference information used in the terminal apparatus in order to mitigate interference from a cell-specific reference signal and/or at least one of second interference information used in the terminal apparatus in order to mitigate interference from a downlink shared channel, third interference information used in the terminal apparatus in order to mitigate interference from a downlink control channel, and fourth interference information used in the terminal apparatus in order to mitigate interference from an enhanced downlink shared channel is configured from the base station apparatus, in which the first interference information includes one or more pieces of first support information, the second interference information includes one or more pieces of second support information, the third interference information includes one or more pieces of third support information, and the fourth interference information includes one or more pieces of fourth support information.

In the terminal apparatus of the present invention, each of the second interference information, the third interference information, and the fourth interference information is configured in a case where the first interference information is being configured.

In the terminal apparatus of the present invention, each first support information includes a first cell identifier for the cell-specific reference signal, each second support information includes a second cell identifier for the downlink shared channel, each third support information includes a third cell identifier for the downlink control channel, and each fourth support information includes a fourth cell identifier for the enhanced downlink control channel.

In the terminal apparatus of the present invention, the first support information, the second support information, the third support information, and the fourth support information are associated with support information that includes a cell identifier having an identical value as a cell identifier included in each of the first support information, the second support information, the third support information, and the fourth support information.

In the terminal apparatus of the present invention, the first interference information is not configured concurrently with any of the second interference information, the third interference information, and the fourth interference information.

An integrated circuit that is mounted in a terminal apparatus of the present invention is an integrated circuit that is mounted in a terminal apparatus communicating with a base station apparatus, the circuit including means in which first interference information used in the terminal apparatus in order to mitigate interference from a cell-specific reference signal and/or at least one of second interference information used in the terminal apparatus in order to mitigate interference from a downlink shared channel, third interference information used in the terminal apparatus in order to mitigate interference from a downlink control channel, and fourth interference information used in the terminal apparatus in order to mitigate interference from an enhanced downlink shared channel is configured from the base station apparatus, in which the first interference information includes one or more pieces of first support information, the second interference information includes one or more pieces of second support information, the third interference information includes one or more pieces of third support information, and the fourth interference information includes one or more pieces of fourth support information.

Advantageous Effects of Invention

According to the present invention, interference can be effectively mitigated in a radio environment where an interference signal arrives.

BRIEF DESCRIPTION OF DRAWINGS

FIG. 3 is a block diagram illustrating a composition example of a terminal apparatus according to the present embodiment.

DESCRIPTION OF EMBODIMENTS

A communication system in the present embodiment includes a base station apparatus (a transmission apparatus, a cell, a transmission point, a transmit antenna group, a transmit antenna port group, a component carrier, or an eNodeB) and a terminal apparatus (a terminal, a mobile terminal, a reception point, a reception terminal, a reception apparatus, a receive antenna group, a receive antenna port group, or UE).

In the present embodiment, "X/Y" includes the meaning of "X or Y". In the present embodiment, "X/Y" includes the meaning of "X and Y". In the present embodiment, "X/Y" includes the meaning of "X and/or Y".

Figure 1:
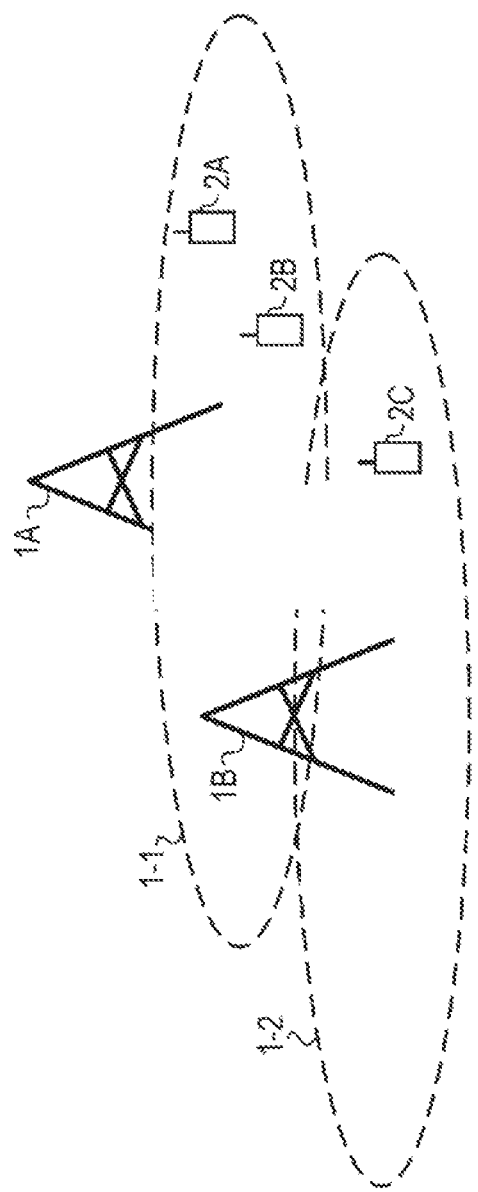
FIG. 1 is a diagram illustrating an example of a communication system according to the present embodiment.

FIG. 1 is a diagram illustrating an example of the communication system according to the present embodiment. As illustrated in FIG. 1, the communication system in the present embodiment includes base station apparatuses 1A and 1B and terminal apparatuses 2A, 2B, and 2C. A coverage 1-1 is an area (communication area) in which the base station apparatus 1A can be connected with a terminal apparatus. A coverage 1-2 is an area (communication area) in which the base station apparatus 1B can be connected with a terminal apparatus. Hereinafter, the terminal apparatuses 2A and 2B may be described as a terminal apparatus 2.

In FIG. 1, in the case of the base station apparatus 1A spatially multiplexing the terminal apparatus 2A and the terminal apparatus 2B or in the case of the terminal apparatus 2 receiving inter-cell interference from the base station apparatus 1B, receive signals in the terminal apparatus 2 include a desired signal destined for the terminal apparatus 2 (referred to as a first terminal apparatus) and a signal destined for an interfering terminal apparatus (referred to as a second terminal apparatus). Specifically, receive signals in the terminal apparatus 2A include a desired signal destined for the terminal apparatus 2A and transmitted from the base station apparatus 1A and interference signals of a signal destined for the terminal apparatus 2B and a signal destined for the terminal apparatus 2C and transmitted from the base station apparatus 1B. Receive signals in the terminal apparatus 2B include a desired signal destined for the terminal apparatus 2B and transmitted from the base station apparatus 1A and interference signals of a signal destined for the terminal apparatus 2A and a signal destined for the terminal apparatus 2C and transmitted from the base station apparatus 1B.

In the present embodiment, a base station apparatus spatially multiplexes a plurality of terminal apparatuses. Thus, the present invention is preferably for the case of the terminal apparatus receiving inter-user interference or the case of the terminal apparatus receiving inter-cell interference from another base station apparatus and is not limited to the communication system of FIG. 1. Inter-user interference and inter-cell interference are not required to be received at the same time. The present invention includes any of the case of receiving only inter-user interference and the case of receiving only inter-cell interference.

The following uplink physical channels are used in uplink radio communication from the terminal apparatus 2 to the base station apparatus 1A in FIG. 1. The uplink physical channels are used in order to transmit information output from a higher layer.

Physical uplink control channel (PUCCH)
Physical uplink shared channel (PUSCH)
Physical random access channel (PRACH)

PUCCH is used in order to transmit uplink control information (UCI). The uplink control information includes a positive acknowledgement (ACK) or a negative acknowledgement (NACK) (ACK/NACK) for downlink data (downlink transport block or downlink shared channel (DL-SCH)). ACK/NACK for downlink data may be referred to as HARQ-ACK or HARQ feedback.

The uplink control information includes channel state information (CSI) for a downlink. In addition, the uplink control information includes a scheduling request (SR) that is used in order to request the resource of an uplink shared channel (UL-SCH). The channel state information corresponds to a rank indicator RI that specifies an appropriate number of spatial multiplexing, a precoding matrix indicator PMI that specifies an appropriate precoder, a channel quality indicator CQI that specifies an appropriate transmission rate, and the like.

The channel quality indicator CQI (hereinafter, a CQI value) can be an appropriate modulation scheme (for example, QPSK, 16QAM, 64QAM, or 256QAM) in a prescribed band (described in detail later) or a code rate. The CQI value can be an index (CQI index) that is determined by the modulation scheme or the code rate. The CQI value can be determined in advance in the system.

The rank indicator and the precoding quality indicator can be determined in advance in the system. The rank indicator or the precoding matrix indicator can be an index that is determined by the number of spatial multiplexing or precoding matrix information. The rank indicator, the precoding matrix indicator, and the value of the channel quality indicator CQI are collectively referred to as a CSI value.

PUSCH is used in order to transmit uplink data (uplink transport block or UL-SCH). PUSCH may be used in order to transmit, along with the uplink data, ACK/NACK for the downlink data and/or the channel state information. PUSCH may be used in order to transmit only the uplink control information.

PUSCH is used in order to transmit an RRC message. The RRC message is information/signal that is processed in a radio resource control (RRC) layer. In addition, PUSCH is used in order to transmit an MAC control element (CE). MAC CE is information/signal that is processed (transmitted) in a medium access control (MAC) layer.

For example, power headroom may be included in MAC CE and reported via PUSCH. That is, a field of MAC CE may be used in order to indicate the level of power headroom.

PRACH is used in order to transmit a random access preamble.

In uplink radio communication, an uplink reference signal (UL RS) is used as an uplink physical signal. The uplink physical signal is not used for transmitting information output from a higher layer and is used by a physical layer. The uplink reference signal includes a demodulation reference signal (DMRS) and a sounding reference signal (SRS).

DMRS is associated with transmission in PUSCH or PUCCH. For example, the base station apparatus 1A uses DMRS in order to perform propagation channel correction of PUSCH or PUCCH. SRS is not associated with transmission in PUSCH or PUCCH. For example, the base station apparatus 1A uses SRS in order to measure the uplink channel state.

The following downlink physical channels are used in downlink radio communication from the base station apparatus 1A to the terminal apparatus 2 in FIG. 1. The downlink physical channels are used in order to transmit information output from a higher layer.

Physical broadcast channel (PBCH)
Physical control format indicator channel (PCFICH)
Physical hybrid automatic repeat request indicator channel (PHICH; HARQ indicator channel)
Physical downlink control channel (PDCCH)
Enhanced physical downlink control channel (EPDCCH)
Physical downlink shared channel (PDSCH)

PBCH is used in order to broadcast master information block (MIB; broadcast channel (BCH)) that is used in common (cell-specific) in the terminal apparatus 2. PCFICH is used in order to transmit information that indicates a region (for example, the number of OFDM symbols) used in transmission in PDCCH.

PHICH is used in order to transmit ACK/NACK for uplink data (transport block or code word) received by the base station apparatus 1A. That is, PHICH is used in order to transmit an HARQ indicator (HARQ feedback) that indicates ACK/NACK for the uplink data. ACK/NACK is referred to as HARQ-ACK as well. The terminal apparatus 2 notifies a higher layer of the received ACK/NACK. ACK/NACK includes ACK that indicates correct reception, NACK that indicates incorrect reception, and DTX that indicates that there is no corresponding data. In the case of PHICH not existing for uplink data, the terminal apparatus 2 notifies a higher layer of ACK.

PDCCH and EPDCCH are used in order to transmit downlink control information (DCI). A plurality of DCI formats is defined for transmission of the downlink control information. That is, a field for the downlink control information is defined in a DCI format and is mapped to an information bit.

As a DCI format for the downlink, for example, a DCI format 1A that is used in scheduling of one PDSCH (transmission of one downlink transport block) in one cell is defined.

The DCI format for the downlink, for example, includes the downlink control information such as information related to PDSCH resource assignment, information related to a modulation and coding scheme (MCS) for PDSCH, and a TPC command for PUCCH. The DCI format for the downlink is referred to as downlink grant (or downlink assignment) as well.

As a DCI format for an uplink, for example, a DCI format 0 that is used in scheduling of one PUSCH (transmission of one uplink transport block) in one cell is defined.

The DCI format for the uplink, for example, includes the uplink control information such as information related to PUSCH resource assignment, information related to MCS for PUSCH, and a TPC command for PUSCH. The DCI format for the uplink is referred to as uplink grant (or uplink assignment) as well.

The DCI format for the uplink can be used in order to request the channel state information (CSI; referred to as reception quality information as well) of the downlink (CSI request). The channel state information corresponds to the rank indicator (RI) that specifies an appropriate number of spatial multiplexing, the precoding matrix indicator (PMI) that specifies an appropriate precoder, the channel quality indicator (CQI) that specifies an appropriate transmission rate, and the like.

The DCI format for the uplink can be used for a configuration that indicates an uplink resource to which a channel state information report (CSI feedback report) fed back to the base station apparatus by the terminal apparatus is mapped. For example, the channel state information report can be used for a configuration indicating an uplink resource that periodically reports the channel state information (periodic CSI). The channel state information report can be used in order to configure a mode (CSI report mode) that periodically reports the channel state information.

For example, the channel state information report can be used for a configuration indicating an uplink resource that reports aperiodic channel state information (aperiodic CSI). The channel state information report can be used in order to configure a mode (CSI report mode) that aperiodically reports the channel state information. The base station apparatus 1A and the base station apparatus 1B can configure any of the periodic channel state information report and the aperiodic channel state information report. In addition, the base station apparatuses 1A and 1B can configure both of the periodic channel state information report and the aperiodic channel state information report.

The DCI format for the uplink can be used for a configuration that indicates the type of the channel state information report fed back to the base station apparatus by the terminal apparatus. The type of the channel state information report is wideband CSI (for example, wideband CQI), narrowband CSI (for example, subband CQI), or the like.

The DCI format for the uplink can be used in order to configure a mode that includes the periodic channel state information report or the aperiodic channel state information report and the type of the channel state information report. For example, there is a mode that reports the aperiodic channel state information report and wideband CSI, a mode that reports the aperiodic channel state information report and narrowband CSI, a mode that reports the aperiodic channel state information report, wideband CSI, and narrowband CSI, a mode that reports the periodic channel state information report and wideband CSI, a mode that reports the periodic channel state information report and narrowband CSI, a mode that reports the periodic channel state information report, wideband CSI, and narrowband CSI, or the like.

The terminal apparatus 2, in the case of the resource of PDSCH being scheduled by using downlink assignment, receives downlink data in scheduled PDSCH. The terminal apparatus 2, in the case of the resource of PUSCH being scheduled by using uplink grant, transmits uplink data and/or the uplink control information in scheduled PUSCH.

PDSCH is used in order to transmit downlink data (downlink transport block or DL-SCH). In addition, PDSCH is used in order to transmit a system information block type 1 message. The system information block type 1 message is cell-specific information.

PDSCH is used in order to transmit a system information message. The system information message includes a system information block X other than a system information block type 1. The system information message is cell-specific information.

PDSCH is used in order to transmit an RRC message. An RRC message transmitted from the base station apparatus 1A may be common to the plurality of terminal apparatuses 2 in a cell. The RRC message transmitted from the base station apparatus 1A may be a message dedicated to a certain terminal apparatus 2 (referred to as dedicated signaling as well). That is, information that is specific to a user apparatus is transmitted by using a message dedicated to a certain terminal apparatus 2. In addition, PDSCH is used in order to transmit MAC CE.

An RRC message and/or MAC CE is referred to as higher layer signaling as well.

PDSCH can be used in order to request downlink channel state information. In addition, PDSCH can be used in order to transmit an uplink resource to which the channel state information report (CSI feedback report) fed back to the base station apparatus by the terminal apparatus is mapped. For example, the channel state information report can be used for a configuration indicating an uplink resource that periodically reports the channel state information (periodic CSI). The channel state information report can be used in order to configure a mode (CSI report mode) that periodically reports the channel state information.

The type of the downlink channel state information report is wideband CSI (for example, wideband CSI) or narrowband CSI (for example, subband CSI). Wideband CSI calculates one piece of channel state information for the system band of a cell. Narrowband CSI divides the system band in prescribed units and calculates one piece of channel state information for the division.

In downlink radio communication, a synchronization signal (SS) and a downlink reference signal (DL RS) are used as a downlink physical signal. The downlink physical signal is not used for transmitting information output from a higher layer and is used by the physical layer.

The synchronization signal is used in order for the terminal apparatus 2 to synchronize a downlink frequency domain with a time domain. The downlink reference signal is used in order for the terminal apparatus 2 to perform propagation channel correction of the downlink physical channel. For example, the downlink reference signal is used in order for the terminal apparatus 2 to calculate the downlink channel state information.

The downlink reference signal includes a cell-specific reference signal (CRS), a UE-specific reference signal (URS) associated with PDSCH, a demodulation reference signal (DMRS) associated with EPDCCH, a non-zero power channel state information reference signal (NZP CSI-RS), and a zero power channel state information reference signal (ZP CSI-RS).

CRS is transmitted in the entire band of a subframe and is used in order to demodulate PBCH/PDCCH/PHICH/PCFICH/PDSCH. URS that is associated with PDSCH is transmitted in a subframe and a band used in transmission of PDSCH with which URS is associated, and is used in order to demodulate PDSCH with which URS is associated.

DMRS that is associated with EPDCCH is transmitted in a subframe and a band used in transmission of EPDCCH with which DMRS is associated. DMRS is used in order to demodulate EPDCCH with which DMRS is associated.

The resource of NZP CSI-RS is configured by the base station apparatus 1A. For example, the terminal apparatus 2 measures a signal (measures a channel) by using NZP CSI-RS. The resource of ZP CSI-RS is configured by the base station apparatus 1A. The base station apparatus 1A transmits ZP CSI-RS as a zero output. For example, the terminal apparatus 2 measures interference in the resource to NZP CSI-RS corresponds.

The resource of ZP CSI-RS is configured by the base station apparatus 1A. The base station apparatus 1B transmits ZP CSI-RS as a zero output. That is, the base station apparatus 1A does not transmit ZP CSI-RS. The base station apparatus 1B does not transmit PDSCH and EPDCCH in the configured resource of ZP CSI-RS. The terminal apparatus 2C can measure interference in, for example, the resource to which NZP CSI-RS corresponds in a certain cell.

Multimedia broadcast multicast service single frequency network (MBSFN) RS is transmitted in the entire band of a subframe used in transmission of PMCH. MBSFN RS is used in order to demodulate PMCH. PMCH is transmitted in an antenna port used in transmission of MBSFN RS.

The downlink physical channel and the downlink physical signal are collectively referred to as a downlink signal as well. The uplink physical channel and the uplink physical signal are collectively referred to as an uplink signal as well. The downlink physical channel and the uplink physical channel are collectively referred to as a physical channel as well. The downlink physical signal and the uplink physical signal are collectively referred to as a physical signal as well.

BCH, UL-SCH, and DL-SCH are transport channels. A channel that is used in the MAC layer is referred to as a transport channel. The unit of the transport channel used in the MAC layer is referred to as a transport block (TB) or a MAC protocol data unit (PDU) as well. The transport block is the unit of data that the MAC layer passes (delivers) to the physical layer. In the physical layer, the transport block is mapped to a code word, and a coding process or the like is performed for each code word.

The terminal apparatus can include a function of canceling or suppressing inter-user interference or inter-cell interference. Such a technology is under review as network assisted interference cancellation and suppression (NAICS) by 3rd Generation Partnership Project (3GPP). In NAICS, the base station apparatus transmits NAICS assistance information that the terminal apparatus uses in order to handle, cancel, or suppress an interference signal. The terminal apparatus receives the NAICS assistance information, detects a parameter for cancellation or suppression of an interference signal on the basis of the NAICS assistance information, and cancels or suppresses an interference signal by using the parameter.

The base station apparatus transmits PDSCH assistance information (called second support information, first NAICS assistance information, or PDSCH interference assistance information as well) as the NAICS assistance information. The terminal apparatus receives the PDSCH assistance information, detects a parameter for cancellation or suppression of an interference signal on the basis of the assistance information, and cancels or suppresses the interference signal by using the parameter. The PDSCH assistance information includes a part or the entirety of cell ID, the number of CRS antenna ports, an MBSFN subframe pattern, PB, virtual cell ID, a scrambling identity (nSCID), PA, a transmission mode, quasi co-location information (QCL information), a ZP/NZP CSI-RS configuration, a PDSCH starting position, a TDD UL/DL configuration, a precoding matrix indicator/rank indicator, a modulation scheme, and resource assignment information. The PDSCH assistance information can include a part or the entirety of PDCCH assistance information and EPDCCH assistance information described later.

PA is the power ratio of PDSCH and CRS in an OFDM symbol where CRS is not arranged. PB represents the power ratio of PDSCH in an OFDM symbol where CRS is arranged and PDSCH in an OFDM symbol where CRS is not arranged. QCL information is information related to QCL for a prescribed antenna port, a prescribed signal, or a prescribed channel. For two antenna ports, in a case where the long-term characteristic of a channel in which a symbol on one antenna port is transported can be estimated from a channel in which a symbol on another antenna port is transported, these antenna ports are called QCL. The long-term characteristic includes a delay spread, a Doppler spread, a Doppler shift, an average gain and/or an average delay. That is, in the case of two antenna ports being QCL, the terminal apparatus can regard the long-term characteristics in these antenna ports as being the same.

Each parameter included in the PDSCH assistance information may have one value (candidate) configured or may have a plurality of values (candidates) configured. In the case of configuring a plurality of values, the terminal apparatus analyzes the parameter as indicating a value that is likely to be configured by an interfering base station apparatus, and detects a parameter configured for an interference signal from the plurality of values. The PDSCH assistance information may indicate information as to another base station apparatus or may indicate information as to the base station apparatus.

The PDSCH assistance information is used by the terminal apparatus at the time of demodulating PDSCH for the terminal apparatus in order to handle, cancel, or suppress interference from PDSCH for another terminal apparatus. The PDSCH assistance information includes at least information related to mapping with respect to a resource element of PDSCH for another terminal apparatus. The PDSCH assistance information may be used at the time of performing various measurements. The measurements include a radio resource management (RRM) measurement, a radio link monitoring (RLM) measurement, and a channel state information (CSI) measurement.

The terminal apparatus detects (specifies) PDSCH interference on the basis of the configured PDSCH assistance information and processes, mitigates, or cancels the detected PDSCH interference. The PDSCH assistance information may include quasi-static control information having a comparatively long update frequency and not include dynamic control information having a comparatively short update frequency. The quasi-static control information includes cell ID, the number of CRS antenna ports, an MBSFN subframe pattern, PB, virtual cell ID, a scrambling identity (nSCID), PA, a transmission mode, quasi co-location information (QCL information), a ZP/NZP CSI-RS configuration, a PDSCH starting position, a TDD UL/DL configuration, and the like. The dynamic control information includes a precoding matrix indicator/rank indicator, a modulation scheme, resource assignment information, and the like. Each parameter included in the PDSCH assistance information may have a plurality of values (candidates) configured. Thus, the PDSCH assistance information can be regarded as information for indicating a plurality of PDSCH interference candidates. The terminal apparatus can perform blind detection that tries detecting, in order, PDSCH interference candidates which can be recognized on the basis of the PDSCH assistance information.

Accordingly, the terminal apparatus can mitigate interference from PDSCH for another terminal apparatus on the basis of the parameter detected from the PDSCH assistance information and thus can accurately acquire a signal destined for the terminal apparatus. In addition, since the PDSCH assistance information indicates a plurality of candidates, less influence can be exerted on scheduling of the base station apparatus. The terminal apparatus may be said to perform blind detection of a parameter that is not received as the assistance information. Cancellation or suppression of an interference signal can be performed by linear detection or non-linear detection. The linear detection allows detection considering a channel of a desired signal destined for the terminal apparatus and a channel of an interference signal destined for another terminal apparatus. Such linear detection is called enhanced linear minimum mean square error interference rejection combining (ELMMSE-IRC) as well. As the non-linear detection, an interference canceller or maximum likelihood detection can be used.

The base station apparatus can change the PDSCH assistance information into a list as a PDSCH assistance information list and transmit the PDSCH assistance information list. The PDSCH assistance information list can include at least one piece of PDSCH assistance information. In addition, the PDSCH assistance information list can be transmitted as neighbor cell PDSCH information (called second interference information as well).

The base station apparatus transmits PDCCH assistance information (called third support information, second NAICS assistance information, or PDCCH interference assistance information as well) as the NAICS assistance information. The terminal apparatus receives the PDCCH assistance information, detects a parameter for processing, handling, cancellation, or suppression of an interference signal from PDCCH on the basis of the PDCCH assistance information, and processes, handles, cancels, or suppresses the interference signal from PDCCH by using the parameter. The PDCCH assistance information includes a part or the entirety of cell ID, the number of CRS antenna ports, an MBSFN subframe pattern, a control format indicator, information related to a power control parameter, and the like. The power control parameter includes a part or the entirety of power control RNTI (tpcRNTI), a power control index (tpc index), a power boost value for each OFDM symbol (a power boost limit in eNB), information related to the granularity of a resource element, information related to a downlink control information (DCI) format, information related to a transmission mode, information related to a slot number, information related to RNTI, and information related to a system bandwidth. Furthermore, the PDCCH assistance information can include a part or the entirety of the PDSCH assistance information and EPDCCH assistance information described later.

The control format indicator is information related to the number of OFDM symbols that are used in order to transmit the control channel information. The control format indicator can also be used at the time of calculating a start symbol in which a channel such as PDSCH and EPDCCH (described later) is arranged. The power boost value is the power boost value of transmittable PDCCH in a neighbor cell. The granularity of a resource element is frequency resolution for PDCCH power control in a neighbor cell.

Each parameter included in the PDCCH assistance information may have one value (candidate) configured or may have a plurality of values (candidates) configured. In the case of configuring a plurality of values, the terminal apparatus analyzes the parameter as indicating a value that is likely to be configured by an interfering base station apparatus, and detects a parameter configured for an interference signal from the plurality of values. The PDCCH assistance information may indicate information as to another base station apparatus (non-serving cell) or may indicate information as to the base station apparatus (serving cell).

The PDCCH assistance information is used by the terminal apparatus at the time of demodulating a signal for the terminal apparatus in order to handle, cancel, or suppress interference from PDCCH for another terminal apparatus. The PDCCH assistance information includes at least information related to mapping with respect to a resource element of PDCCH for another terminal apparatus. The PDCCH assistance information may be used at the time of performing various measurements. The measurements include a radio resource management (RRM) measurement, a radio link monitoring (RLM) measurement, and a channel state information (CSI) measurement.

The terminal apparatus detects (specifies) PDCCH interference on the basis of the configured PDCCH assistance information and mitigates the detected PDCCH interference. Each parameter included in the PDCCH assistance information may have a plurality of values (candidates) configured. Thus, the PDCCH assistance information can be regarded as information for indicating a plurality of PDCCH interference candidates. The terminal apparatus can perform blind detection that tries detecting, in order, PDCCH interference candidates which can be recognized on the basis of the PDCCH assistance information.

Accordingly, the terminal apparatus can mitigate interference from PDCCH for another terminal apparatus on the basis of the parameter detected from the PDCCH assistance information and thus can accurately acquire a signal destined for the terminal apparatus. In addition, since the PDCCH assistance information indicates a plurality of candidates, less influence can be exerted on scheduling of the base station apparatus. The terminal apparatus may be said to perform blind detection of a parameter that is not received as the assistance information. Cancellation or suppression of an interference signal can be performed by linear detection or non-linear detection.

The base station apparatus can change the PDCCH assistance information into a list as a PDCCH assistance information list and transmit the PDCCH assistance information list. The PDCCH assistance information list can include at least one piece of PDCCH assistance information. In addition, the PDCCH assistance information list can be transmitted as neighbor cell PDCCH information (third interference information).

Each piece of PDCCH assistance information included in the PDCCH assistance information list can be configured as independent information for each cell. That is, interference from PDCCH can be individually handled for each cell.

Information that is not included or configured in the PDCCH assistance information may be based on information that is used in a serving cell where the PDCCH assistance information is configured. For example, the terminal apparatus assumes that information that is not included or configured in the PDCCH assistance information is the same as information that is used in a serving cell where the PDCCH assistance information is configured.

The base station apparatus transmits EPDCCH assistance information (called fourth support information, third NAICS assistance information, or EPDCCH interference assistance information as well) as the NAICS assistance information. The terminal apparatus receives the EPDCCH assistance information, detects a parameter for cancellation or suppression of an interference signal on the basis of the assistance information, and cancels or suppresses the interference signal by using the parameter. The EPDCCH assistance information includes a part or the entirety of information such as cell ID, the number of CRS antenna ports, an MBSFN subframe pattern, demodulation reference signal scrambling sequence initialization information (dmrs—scrambling sequence initialization), an EPDCCH set configuration (EPDCCH-SetConfig), the number of PRB pairs (called numberPRB-Pairs or EPDCCH-PRB-set as well), a PUCCH format resource starting position (pucch-ResourceStartOffset), remapping QCL configuration ID (reMappingQCL-ConfigId), resource block assignment (resourceBlockAssignment), EPDCCH set configuration ID (setConfigId), a start symbol (startSymbol), a subframe pattern configuration (subframePatternConfig), a transmission type (transmissionType), and a control format indicator. Furthermore, the EPDCCH assistance information can include a part or the entirety of the PDSCH assistance information and the PDCCH assistance information.

The base station apparatus can include a part or the entirety of the PDSCH assistance information, the PDCCH assistance information, and the EPDCCH assistance information as the NAICS assistance information.

The demodulation reference signal scrambling sequence initialization information is a parameter that initializes a DMRS scrambling sequence in EPDCCH. The EPDCCH set configuration is a parameter that is provided by eNB and indicates that EPDCCH is configured. The number of PRB pairs (called numberPRB-Pairs or EPDCCH-PRB-set as well) is a parameter that indicates the number of physical resource blocks used for an EPDCCH set. The PUCCH format resource starting position (pucch-ResourceStartOffset) is a parameter that indicates a resource start offset for EPDCCH. The remapping QCL configuration ID (reMappingQCL-ConfigId) is a parameter that indicates a start OFDM symbol for EPDCCH, a parameter related to rate matching, and quasi co-location assumption, and is a parameter that is configured in a prescribed transmission mode (for example, at the time of a transmission mode 10 in LTE).

The resource block assignment (resourceBlockAssignment) is a parameter that indicates an index of a specific combination of a physical resource block pair for an EPDCCH set. The EPDCCH set configuration ID (setConfigId) is a parameter that indicates EPDCCH set identification ID. The start symbol (startSymbol) is a parameter that indicates an OFDM start symbol for EPDCCH and PDSCH scheduled by EPDCCH in the same cell. The subframe pattern configuration (subframePatternConfig) is a parameter that configures a subframe in which a terminal monitors a terminal-specific search space (UE-specific search space) in EPDCCH. The transmission type (transmissionType) is a parameter that indicates if any of a distributed EPDCCH transmission mode and a localized EPDCCH transmission mode is used.

Each parameter included in the EPDCCH assistance information may have one value (candidate) configured or may have a plurality of values (candidates) configured. In the case of configuring a plurality of values, the terminal apparatus analyzes the parameter as indicating a value that is likely to be configured by an interfering base station apparatus, and detects a parameter configured for an interference signal from the plurality of values. The EPDCCH assistance information may indicate information as to another base station apparatus or may indicate information as to the base station apparatus.

The EPDCCH assistance information is used by the terminal apparatus at the time of demodulating a signal for the terminal apparatus in order to handle, cancel, or suppress interference from EPDCCH for another terminal apparatus. The EPDCCH assistance information includes at least information related to mapping with respect to a resource element of EPDCCH for another terminal apparatus. The EPDCCH assistance information may be used at the time of performing various measurements. The measurements include a radio resource management (RRM) measurement, a radio link monitoring (RLM) measurement, and a channel state information (CSI) measurement.

The terminal apparatus detects (specifies) EPDCCH interference on the basis of the configured EPDCCH assistance information and mitigates the detected EPDCCH interference. Each parameter included in the EPDCCH assistance information may have a plurality of values (candidates) configured. Thus, the EPDCCH assistance information can be regarded as information for indicating a plurality of EPDCCH interference candidates. The terminal apparatus can perform blind detection that tries detecting, in order, PDCCH interference candidates which can be recognized on the basis of the EPDCCH assistance information.

Accordingly, the terminal apparatus can mitigate interference from EPDCCH for another terminal apparatus on the basis of the parameter detected from the EPDCCH assistance information and thus can accurately acquire a signal destined for the terminal apparatus. In addition, since the EPDCCH assistance information indicates a plurality of candidates, less influence can be exerted on scheduling of the base station apparatus. The terminal apparatus may be said to perform blind detection of a parameter that is not received as the assistance information. Cancellation or suppression of an interference signal can be performed by linear detection or non-linear detection.

The base station apparatus can change the EPDCCH assistance information into a list as a EPDCCH assistance information list and transmit the EPDCCH assistance information list. The EPDCCH assistance information list can include at least one piece of EPDCCH assistance information. In addition, the EPDCCH assistance information list can be transmitted as neighbor cell EPDCCH information (fourth interference information).

Each piece of EPDCCH assistance information included in the EPDCCH assistance information list can be configured as independent information for each cell. That is, interference from EPDCCH can be individually handled for each cell.

Information that is not included or configured in the EPDCCH assistance information may be based on information that is used in a serving cell where the EPDCCH assistance information is configured. For example, the terminal apparatus assumes that information that is not included or configured in the EPDCCH assistance information is the same as information that is used in a serving cell where the EPDCCH assistance information is configured.

The terminal apparatus, in the case of interference from CRS transmitted from another base station apparatus, can mitigate interference received from CRS of another base station apparatus by using CRS assistance information (called first support information as well) that is transmitted by a higher layer signal from the base station apparatus. The CRS assistance information is information as to another base station apparatus and includes cell ID, the number of CRS antenna ports, and an MBSFN subframe configuration list.

The CRS assistance information is transmitted after changing into a list by a CRS assistance information list. The CRS assistance information list includes at least one piece of CRS assistance information. The CRS assistance information list is transmitted as neighbor cell CRS information (called first interference information as well).

Figure 2:
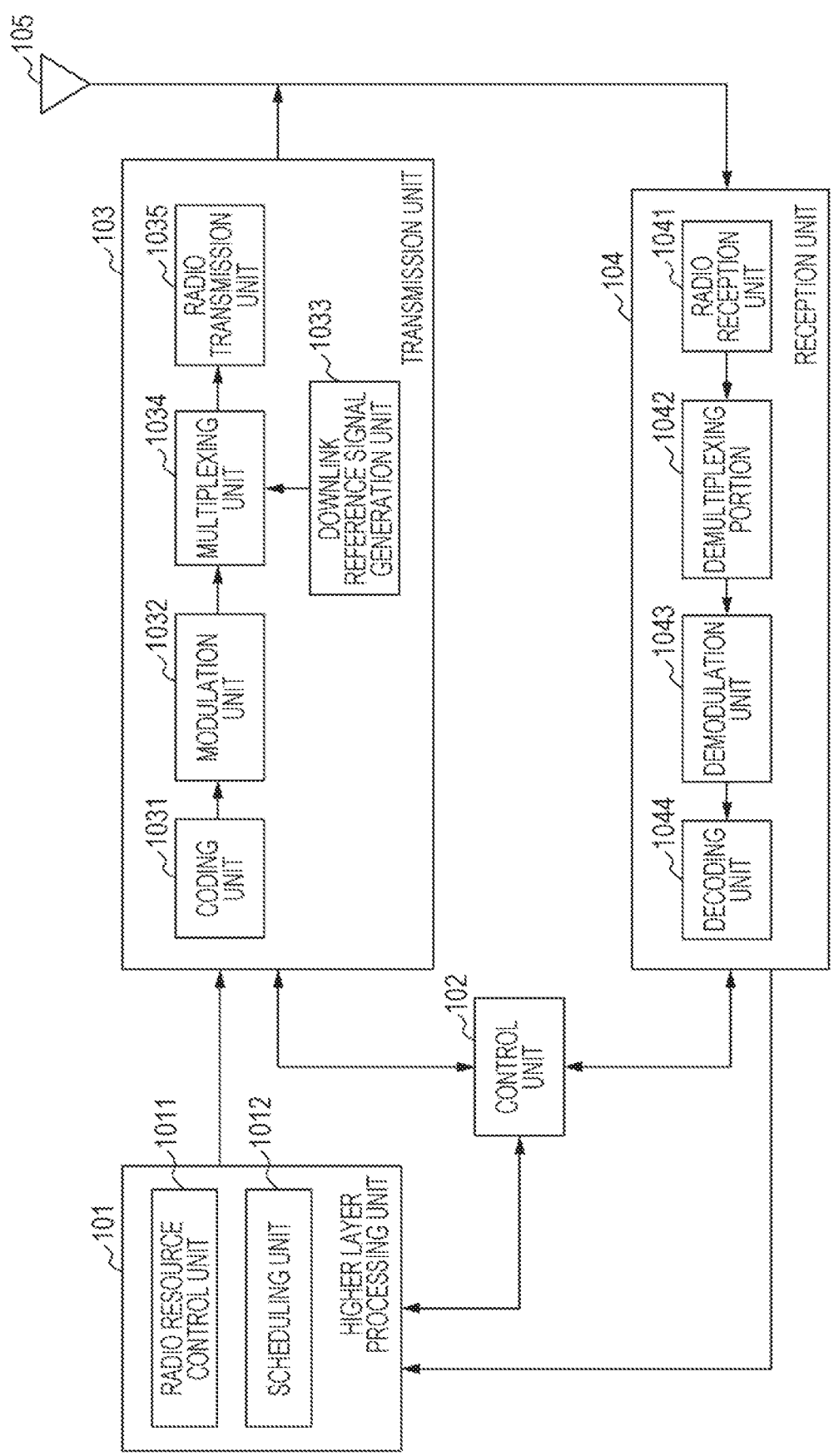
FIG. 2 is a block diagram illustrating a composition example of a base station apparatus according to the present embodiment.

FIG. 2 is a schematic block diagram illustrating composition of the base station apparatus 1A in the present embodiment. As illustrated in FIG. 2, the base station apparatus 1A is constituted to include a higher layer processing unit 101, a control unit 102, a transmission unit 103, a reception unit 104, and a transmit and receive antenna 105. The higher layer processing unit 101 is constituted to include a radio resource control unit 1011 and a scheduling unit 1012. The transmission unit 103 is constituted to include a coding unit 1031, a modulation unit 1032, a downlink reference signal generation unit 1033, a multiplexing unit 1034, and a radio transmission unit 1035. The reception unit 104 is constituted to include a radio reception unit 1041, a demultiplexing portion 1042, a demodulation unit 1043, and a decoding unit 1044.

The higher layer processing unit 101 performs processing in a medium access control (MAC) layer, a packet data convergence protocol (PDCP) layer, a radio link control (RLC) layer, and a radio resource control (RRC) layer. The higher layer processing unit 101 generates information required for controlling the transmission unit 103 and the reception unit 104 and outputs the information to the control unit 102.

The higher layer processing unit 101 receives information related to the terminal apparatus, such as the function of the terminal apparatus (UE capability), from the terminal apparatus. In other words, the terminal apparatus transmits the function thereof to the base station apparatus by using a higher layer signal.

The function of the terminal apparatus can include a parameter that indicates whether or not NAICS is supported. In the case of NAICS having a plurality of functions, the terminal apparatus can transmit individual parameters indicating whether or not each function is supported to the base station apparatus. For example, in the case of two functions "PDSCH interference handling and CRS interference handling" being included as NAICS, the terminal apparatus can transmit, to the base station apparatus, a signal indicating whether or not PDSCH interference handling is supported and a signal indicating whether or not CRS interference handling is supported. Similarly, in the case of two functions "PDCCH interference handling and CRS interference handling", "EPDCCH interference handling and CRS interference handling", "PDSCH interference handling and PDCCH interference handling", "PDSCH interference handling and EPDCCH interference handling", or "PDCCH interference handling and EPDCCH interference handling" being included as NAICS, the terminal apparatus can transmit individual parameters indicating whether or not each function is supported to the base station apparatus.

For example, in the case of three functions "PDSCH interference handling, PDCCH interference handling, and CRS interference handling" being included as NAICS, the terminal apparatus can transmit, to the base station apparatus, a signal indicating whether or not PDSCH interference handling is supported, a signal indicating whether or not PDCCH interference handling is supported, and a signal indicating whether or not CRS interference handling is supported. Similarly, in the case of three functions "PDCCH interference handling, EPDCCH interference handling, and CRS interference handling", "EPDCCH interference handling, PDSCH interference handling, and CRS interference handling", or "PDSCH interference handling, PDCCH interference handling, and EPDCCH interference handling" being included as NAICS, the terminal apparatus can transmit individual parameters indicating whether or not each function is supported to the base station apparatus.

For example, in the case of four functions "PDSCH interference handling, PDCCH interference handling, EPDCCH interference handling, and CRS interference handling" being included as NAICS, the terminal apparatus can transmit, to the base station apparatus, a signal indicating whether or not PDSCH interference handling is supported, a signal indicating whether or not PDCCH interference handling is supported, a signal indicating whether or not EPDCCH interference handling is supported, and a signal indicating whether or not CRS interference handling is supported.

The higher layer processing unit 101 determines whether or not to configure the NAICS assistance information and whether or not to configure the CRS assistance information. Furthermore, the higher layer processing unit 101 can determine whether or not to configure the PDSCH assistance information, whether or not to configure the PDCCH assistance information, or whether or not to configure the EPDCCH assistance information. The base station apparatus can determine whether or not to configure these pieces of assistance information from the function of the terminal apparatus.

PDSCH interference handling, PDCCH interference handling, EPDCCH interference handling, and/or CRS interference handling can be configured as independent parameters. The parameters may be in a dependent relationship with each other. For example, the terminal apparatus that supports the function of PDSCH interference handling supports the function of CRS interference handling. The terminal apparatus that supports the function of PDCCH interference handling and/or EPDCCH interference handling supports the function of CRS interference handling and/or PDSCH interference handling.

In the present embodiment, information related to the terminal apparatus may be a parameter, in addition to a parameter indicating whether or not the terminal apparatus supports the function thereof, that indicates whether or not mounting and/or test related to the function of the terminal apparatus is completed.

The radio resource control unit 1011 generates, or acquires from a higher node, downlink data (transport block) arranged in downlink PDSCH, system information, an RRC message, MAC CE, and the like. The radio resource control unit 1011 outputs the downlink data to the transmission unit 103 and outputs other information to the control unit 102. In addition, the radio resource control unit 1011 manages various types of configuration information as to the terminal apparatus 2. These types of configuration information can include configuration information as to an interfering terminal apparatus. Alternatively, configuration information as to an interfering terminal apparatus can be acquired from configuration information as to the terminal apparatus. In addition, configuration information as to an interfering base station apparatus can be included. The base station apparatus 1A can acquire, from another base station apparatus 1B (by, for example, X2 interface, Internet line, or the like), information required for cancellation/suppression of interference such as configuration information as to the interfering terminal apparatus and the interfering base station apparatus.

The base station apparatus can transmit the PDSCH assistance information and the CRS assistance information, or the PDSCH assistance information to the terminal apparatus that has a capability of canceling PDSCH and/or CRS interference.

The base station apparatus can transmit the PDCCH assistance information and the CRS assistance information, or the PDCCH assistance information to the terminal apparatus that has a capability of canceling PDCCH and/or CRS interference.

The base station apparatus can transmit the EPDCCH assistance information and the CRS assistance information, or the PDCCH assistance information to the terminal apparatus that has a capability of canceling EPDCCH and/or CRS interference.

The base station apparatus can transmit the PDSCH assistance information and the PDCCH assistance information, or the PDSCH assistance information or the PDCCH assistance information to the terminal apparatus that has a capability of canceling PDSCH and/or PDCCH interference.

The base station apparatus can transmit the PDSCH assistance information and the EPDCCH assistance information, or the PDSCH assistance information or the EPDCCH assistance information to the terminal apparatus that has a capability of canceling PDSCH and/or EPDCCH interference.

The base station apparatus can transmit the PDCCH assistance information and the EPDCCH assistance information, or the PDCCH assistance information or the EPDCCH assistance information to the terminal apparatus that has a capability of canceling PDCCH and/or EPDCCH interference.

The base station apparatus can transmit the PDSCH assistance information, the PDCCH assistance information, and the CRS assistance information, or the PDSCH assistance information and the PDCCH assistance information, or the PDSCH assistance information or the PDCCH assistance information to the terminal apparatus that has a capability of canceling PDSCH, PDCCH, and CRS interference.

The base station apparatus can transmit the PDCCH assistance information, the EPDCCH assistance information, and the CRS assistance information, or the PDCCH assistance information and the EPDCCH assistance information, or the PDCCH assistance information or the EPDCCH assistance information to the terminal apparatus that has a capability of canceling PDCCH, EPDCCH, and CRS interference.

The base station apparatus can transmit the PDSCH assistance information, the EPDCCH assistance information, and the CRS assistance information, or the PDSCH assistance information and the EPDCCH assistance information, or the PDSCH assistance information or the EPDCCH assistance information to the terminal apparatus that has a capability of canceling PDSCH, EPDCCH, and CRS interference.

The base station apparatus can transmit the PDSCH assistance information, the PDCCH assistance information, and the EPDCCH assistance information to the terminal apparatus that has a capability of canceling PDSCH, PDCCH, and EPDCCH interference. In addition, the base station apparatus can transmit the PDSCH assistance information and/or the PDCCH assistance information to the terminal apparatus that has a capability of canceling PDSCH, PDCCH, and EPDCCH interference. In addition, the base station apparatus can transmit the PDSCH assistance information and/or the EPDCCH assistance information to the terminal apparatus that has a capability of canceling PDSCH, PDCCH, and EPDCCH interference. In addition, the base station apparatus can transmit the PDCCH assistance information and/or the EPDCCH assistance information to the terminal apparatus that has a capability of canceling PDSCH, PDCCH, and EPDCCH interference.

The base station apparatus can transmit a part or the entirety of the PDSCH assistance information, the PDCCH assistance information, the EPDCCH assistance information, and the CRS assistance information to the terminal apparatus that has a capability of canceling PDSCH, PDCCH, EPDCCH, and CRS interference. For cell identifiers included in each of the PDSCH assistance information, the PDCCH assistance information, the EPDCCH assistance information, and the CRS assistance information, the cell identifier for CRS is called a first cell identifier, the cell identifier for PDSCH is called a second cell identifier, the cell identifier for PDCCH is called a third cell identifier, and the cell identifier for EPDCCH is called a fourth cell identifier.

The following transmission methods are considered for the PDSCH assistance information, the PDCCH assistance information, the EPDCCH assistance information, and the CRS assistance information.

In the case of the PDSCH assistance information and the CRS assistance information being configured in a higher layer, a method considered is such that the base station apparatus transmits the PDSCH assistance information by not including, in the PDSCH assistance information, information that is transmitted by the CRS assistance information. In order to correlate the CRS assistance information with the PDSCH assistance information, an index of the CRS assistance information included in the CRS assistance information list can be associated with an index of the PDSCH assistance information included in the PDSCH assistance information list. For example, in the case of the CRS assistance information list including CRS assistance information 1 and CRS assistance information 2 and the PDSCH assistance information list including PDSCH assistance information 1 and PDSCH assistance information 2, the PDSCH assistance information 1 is associated with the CRS assistance information 1, and the PDSCH assistance information 2 is associated with the CRS assistance information 2. In this case, the terminal apparatus can handle PDSCH interference on the basis of information included in the PDSCH assistance information 1 and the CRS assistance information 1. The number of pieces of CRS assistance information included in the CRS assistance information list can be the same as or different from the number of pieces of PDSCH assistance information included in the PDSCH assistance information list.

In order to correlate the PDSCH assistance information with the CRS assistance information, cell ID can be included in the CRS assistance information and the PDSCH assistance information. That is, the terminal apparatus can detect the cell ID included in the PDSCH assistance information and acquire information related to CRS, that is, the number of CRS antenna ports and an MBSFN subframe configuration, from the CRS assistance information associated with the cell ID. At this point, the terminal apparatus can cancel CRS interference and handle a PDSCH interference signal on the basis of the PDSCH assistance information and the CRS assistance information.

In the case of the PDSCH assistance information not including the CRS assistance information, the PDSCH assistance information can be transmitted only in the case of the base station apparatus transmitting the CRS assistance information. That is, the base station apparatus can configure the neighbor cell PDSCH information only in the case of the neighbor cell CRS information being configured. Otherwise, the base station apparatus has to configure (turn ON) the neighbor cell CRS information in the case of the neighbor cell PDSCH information being configured.

The terminal apparatus can determine a subframe in which PDSCH interference is handled, on the basis of a subframe pattern or a subframe set configured in a higher layer for canceling CRS interference.

In the case of the PDCCH assistance information and the CRS assistance information being configured in a higher layer, a method considered is such that the base station apparatus transmits the PDCCH assistance information by not including, in the PDCCH assistance information, information that is transmitted by the CRS assistance information. In order to correlate the CRS assistance information with the PDCCH assistance information, an index of the CRS assistance information included in the CRS assistance information list can be associated with an index of the PDCCH assistance information included in the PDCCH assistance information list. For example, in the case of the CRS assistance information list including the CRS assistance information 1 and the CRS assistance information 2 and the PDCCH assistance information list including PDCCH assistance information 1 and PDCCH assistance information 2, the PDCCH assistance information 1 is associated with the CRS assistance information 1, and the PDCCH assistance information 2 is associated with the CRS assistance information 2. In this case, the terminal apparatus can handle PDCCH interference on the basis of information included in the PDCCH assistance information 1 and the CRS assistance information 1. The number of pieces of CRS assistance information included in the CRS assistance information list can be the same as or different from the number of pieces of PDCCH assistance information included in the PDCCH assistance information list.

In order to correlate the PDCCH assistance information with the CRS assistance information, cell ID can be included in the CRS assistance information and the PDCCH assistance information. That is, the terminal apparatus can detect the cell ID included in the PDCCH assistance information and acquire information related to CRS, that is, the number of CRS antenna ports and the MBSFN subframe configuration, from the CRS assistance information associated with the cell ID. At this point, the terminal apparatus can cancel CRS interference and handle a PDCCH interference signal on the basis of the PDCCH assistance information and the CRS assistance information.

In the case of the PDCCH assistance information not including the CRS assistance information, the PDCCH assistance information can be transmitted only in the case of the base station apparatus transmitting the CRS assistance information. That is, the base station apparatus can configure the neighbor cell PDCCH information only in the case of the neighbor cell CRS information being configured. Otherwise, the base station apparatus has to configure (turn ON) the neighbor cell CRS information in the case of the neighbor cell PDCCH information being configured.

The terminal apparatus can determine a subframe in which PDCCH interference is handled, on the basis of a subframe pattern or a subframe set configured in a higher layer for canceling CRS interference.

In the case of the EPDCCH assistance information and the CRS assistance information being configured in a higher layer, a method considered is such that the base station apparatus transmits the EPDCCH assistance information by not including, in the EPDCCH assistance information, information that is transmitted by the CRS assistance information. In order to correlate the CRS assistance information with the EPDCCH assistance information, an index of the CRS assistance information included in the CRS assistance information list can be associated with an index of the EPDCCH assistance information included in the EPDCCH assistance information list. For example, in the case of the CRS assistance information list including the CRS assistance information 1 and the CRS assistance information 2 and the EPDCCH assistance information list including EPDCCH assistance information 1 and EPDCCH assistance information 2, the EPDCCH assistance information 1 is associated with the CRS assistance information 1, and the EPDCCH assistance information 2 is associated with the CRS assistance information 2. In this case, the terminal apparatus can handle EPDCCH interference on the basis of information included in the EPDCCH assistance information 1 and the CRS assistance information 1. The number of pieces of CRS assistance information included in the CRS assistance information list can be the same as or different from the number of pieces of EPDCCH assistance information included in the EPDCCH assistance information list.

In order to correlate the EPDCCH assistance information with the CRS assistance information, cell ID can be included in the CRS assistance information and the EPDCCH assistance information. That is, the terminal apparatus can detect the cell ID included in the EPDCCH assistance information and acquire information related to CRS, that is, the number of CRS antenna ports and the MBSFN subframe configuration, from the CRS assistance information associated with the cell ID. At this point, the terminal apparatus can cancel CRS interference and handle an EPDCCH interference signal on the basis of the EPDCCH assistance information and the CRS assistance information.

In the case of the EPDCCH assistance information not including the CRS assistance information, the EPDCCH assistance information can be transmitted only in the case of the base station apparatus transmitting the CRS assistance information. That is, the base station apparatus can configure the neighbor cell EPDCCH information only in the case of the neighbor cell CRS information being configured. Otherwise, the base station apparatus has to configure (turn ON) the neighbor cell CRS information in the case of the neighbor cell EPDCCH information being configured.

The terminal apparatus can determine a subframe in which EPDCCH interference is handled, on the basis of a subframe pattern or a subframe set configured in a higher layer for canceling CRS interference.

In the case of the PDCCH assistance information and the PDSCH assistance information being configured in a higher layer, a method considered is such that the base station apparatus transmits the PDCCH assistance information by not including, in the PDCCH assistance information, information that is transmitted by the PDSCH assistance information. In order to correlate the PDSCH assistance information with the PDCCH assistance information, an index of the PDSCH assistance information included in the PDSCH assistance information list can be associated with an index of the PDCCH assistance information included in the PDCCH assistance information list. For example, in the case of the PDSCH assistance information list including the PDSCH assistance information 1 and the PDSCH assistance information 2 and the PDCCH assistance information list including the PDCCH assistance information 1 and the PDCCH assistance information 2, the PDCCH assistance information 1 is associated with the PDSCH assistance information 1, and the PDCCH assistance information 2 is associated with the PDSCH assistance information 2. In this case, the terminal apparatus can handle PDCCH interference on the basis of information included in the PDCCH assistance information 1 and the PDSCH assistance information 1. The number of pieces of PDSCH assistance information included in the PDSCH assistance information list can be the same as or different from the number of pieces of PDCCH assistance information included in the PDCCH assistance information list.

In order to correlate the PDCCH assistance information with the PDSCH assistance information, cell ID can be included in the PDSCH assistance information and the PDCCH assistance information. That is, the terminal apparatus can detect the cell ID included in the PDCCH assistance information and acquire information related to PDSCH from the PDSCH assistance information associated with the cell ID. At this point, the terminal apparatus can cancel PDSCH interference and handle a PDCCH interference signal on the basis of the PDCCH assistance information and the PDSCH assistance information.

In the case of the PDCCH assistance information not including the PDSCH assistance information, the PDCCH assistance information can be transmitted only in the case of the base station apparatus transmitting the PDSCH assistance information. That is, the base station apparatus can configure the neighbor cell PDCCH information only in the case of the neighbor cell PDSCH information being configured. Otherwise, the base station apparatus has to configure (turn ON) the neighbor cell PDSCH information in the case of the neighbor cell PDCCH information being configured.

The higher layer in the transmission method for the PDSCH assistance information and the PDCCH assistance information can be configured in the same manner even if the PDSCH assistance information and the PDCCH assistance information are reversed.

A higher layer in a transmission method for the PDSCH assistance information and the EPDCCH assistance information can be configured in the same manner as in the transmission method for the PDSCH assistance information and the PDCCH assistance information.

A higher layer in a transmission method for the PDCCH assistance information and the EPDCCH assistance information can be configured in the same manner as in the transmission method for the PDSCH assistance information and the PDCCH assistance information.

In the case of the PDSCH assistance information, the PDCCH assistance information, and the CRS assistance information being configured in a higher layer, a method considered is such that the base station apparatus transmits the PDSCH assistance information and the PDCCH assistance information by not including, in the PDSCH assistance information and the PDCCH assistance information, information that is transmitted by the CRS assistance information. In the case of the PDSCH assistance information, the PDCCH assistance information (includes the PDSCH assistance information in a part thereof), and the CRS assistance information being configured in a higher layer, a method considered is such that the base station apparatus transmits the PDCCH assistance information by not including, in the PDCCH assistance information, information that is transmitted by the CRS assistance information and the PDSCH assistance information. In the case of the PDSCH assistance information (includes the PDCCH assistance information in a part thereof), the PDCCH assistance information, and the CRS assistance information being configured in a higher layer, a method considered is such that the base station apparatus transmits the PDSCH assistance information by not including, in the PDSCH assistance information, information that is transmitted by the CRS assistance information and the PDCCH assistance information.

In the case of the PDSCH assistance information, the PDCCH assistance information, and the CRS assistance information being configured in a higher layer, an index of the CRS assistance information included in the CRS assistance information list, an index of the PDSCH assistance information included in the PDSCH assistance information list, and an index of the PDCCH assistance information included in the PDCCH assistance information list can be associated in order to correlate the CRS assistance information, the PDSCH assistance information, and the PDCCH assistance information.

For example, in the case of the CRS assistance information list including the CRS assistance information 1 and the CRS assistance information 2, the PDSCH assistance information list including the PDSCH assistance information 1 and the PDSCH assistance information 2, and the PDCCH assistance information list including the PDCCH assistance information 1 and the PDCCH assistance information 2, the PDSCH assistance information 1, the PDCCH assistance information 1, and the CRS assistance information 1 are associated, and the PDSCH assistance information 2, the PDCCH assistance information 2, and the CRS assistance information 2 are associated. In this case, the terminal apparatus can handle PDSCH and PDCCH interference on the basis of information included in the PDSCH assistance information 1, the PDCCH assistance information 1, and the CRS assistance information 1. The number of pieces of CRS assistance information included in the CRS assistance information list, the number of pieces of PDSCH assistance information included in the PDSCH assistance information list, and the number of pieces of PDCCH assistance information included in the PDCCH assistance information list can be the same or different.

In order to correlate the PDSCH assistance information, the PDCCH assistance information, and the CRS assistance information, cell ID can be included in the CRS assistance information, the PDSCH assistance information, and the PDCCH assistance information. The terminal apparatus can detect the cell ID included in the PDSCH assistance information and/or the PDCCH assistance information and acquire information related to CRS, that is, the number of CRS antenna ports and the MBSFN subframe configuration, from the CRS assistance information associated with the cell ID.

In addition, the terminal apparatus can detect the cell ID included in the PDCCH assistance information and acquire information related to CRS and information related to PDSCH from the CRS assistance information and the PDSCH assistance information associated with the cell ID.

Similarly, the terminal apparatus can detect the cell ID included in the PDSCH assistance information and acquire information related to CRS and information related to PDCCH from the CRS assistance information and the PDCCH assistance information associated with the cell ID.

In these cases, the terminal apparatus can cancel CRS interference on the basis of the PDSCH assistance information and/or the PDCCH assistance information and the CRS assistance information and can handle a PDSCH and/or PDCCH interference signal.

In the case of the CRS assistance information not being included in the PDSCH assistance information and the PDCCH assistance information, the PDSCH assistance information and the PDCCH assistance information can be transmitted only in the case of the base station apparatus transmitting the CRS assistance information. That is, the base station apparatus can configure the neighbor cell PDSCH information and/or the neighbor cell PDCCH information only in the case of the neighbor cell CRS information being configured. Otherwise, the base station apparatus has to configure (turn ON) the neighbor cell CRS information in the case of the neighbor cell PDSCH information and/or the neighbor cell PDCCH information being configured.

The terminal apparatus can determine a subframe in which PDSCH and PDCCH interference is handled, on the basis of a subframe pattern or a subframe set configured in a higher layer for canceling CRS interference.

In the case of the PDCCH assistance information, the EPDCCH assistance information, and the CRS assistance information being configured in a higher layer, a method considered is such that the base station apparatus transmits the PDCCH assistance information and the EPDCCH assistance information by not including, in the PDCCH assistance information and the EPDCCH assistance information, information that is transmitted by the CRS assistance information. In the case of the PDCCH assistance information, the EPDCCH assistance information (includes the PDCCH assistance information in a part thereof), and the CRS assistance information being configured in a higher layer, a method considered is such that the base station apparatus transmits the EPDCCH assistance information by not including, in the EPDCCH assistance information, information that is transmitted by the CRS assistance information and the PDCCH assistance information. In the case of the PDCCH assistance information (includes the EPDCCH assistance information in a part thereof), the EPDCCH assistance information, and the CRS assistance information being configured in a higher layer, a method considered is such that the base station apparatus transmits the PDCCH assistance information by not including, in the PDCCH assistance information, information that is transmitted by the CRS assistance information and the EPDCCH assistance information.

In the case of the PDCCH assistance information, the EPDCCH assistance information, and the CRS assistance information being configured in a higher layer, an index of the CRS assistance information included in the CRS assistance information list, an index of the PDCCH assistance information included in the PDCCH assistance information list, and an index of the EPDCCH assistance information included in the EPDCCH assistance information list can be associated in order to correlate the CRS assistance information, the PDCCH assistance information, and the EPDCCH assistance information.

For example, in the case of the CRS assistance information list including the CRS assistance information 1 and the CRS assistance information 2, the PDCCH assistance information list including the PDCCH assistance information 1 and the PDCCH assistance information 2, and the EPDCCH assistance information list including the EPDCCH assistance information 1 and the EPDCCH assistance information 2, the PDCCH assistance information 1, the EPDCCH assistance information 1, and the CRS assistance information 1 are associated, and the PDCCH assistance information 2, the EPDCCH assistance information 2, and the CRS assistance information 2 are associated. In this case, the terminal apparatus can handle PDCCH and EPDCCH interference on the basis of information included in the PDCCH assistance information 1, the EPDCCH assistance information 1, and the CRS assistance information 1. The number of pieces of CRS assistance information included in the CRS assistance information list, the number of pieces of PDCCH assistance information included in the PDCCH assistance information list, and the number of pieces of EPDCCH assistance information included in the EPDCCH assistance information list can be the same or different.

In order to correlate the PDCCH assistance information, the EPDCCH assistance information, and the CRS assistance information, cell ID can be included in the CRS assistance information, the PDCCH assistance information, and the EPDCCH assistance information. The terminal apparatus can detect the cell ID included in the PDCCH assistance information and/or the EPDCCH assistance information and acquire information related to CRS, that is, the number of CRS antenna ports and the MBSFN subframe configuration, from the CRS assistance information associated with the cell ID.

In addition, the terminal apparatus can detect the cell ID included in the EPDCCH assistance information and acquire information related to CRS and information related to PDCCH from the CRS assistance information and the PDCCH assistance information associated with the cell ID. Similarly, the terminal apparatus can detect the cell ID included in the PDCCH assistance information and acquire information related to CRS and information related to EPDCCH from the CRS assistance information and the EPDCCH assistance information associated with the cell ID.

In these cases, the terminal apparatus can cancel CRS interference on the basis of the PDCCH assistance information and/or the EPDCCH assistance information and the CRS assistance information and can handle a PDCCH and/or EPDCCH interference signal.

In the case of the CRS assistance information not being included in the PDCCH assistance information and the EPDCCH assistance information, the PDCCH assistance information and the EPDCCH assistance information can be transmitted only in the case of the base station apparatus transmitting the CRS assistance information. That is, the base station apparatus can configure the neighbor cell PDCCH information and/or the neighbor cell EPDCCH information only in the case of the neighbor cell CRS information being configured. Otherwise, the base station apparatus has to configure (turn ON) the neighbor cell CRS information in the case of the neighbor cell PDCCH information and/or the neighbor cell EPDCCH information being configured.

The terminal apparatus can determine a subframe in which PDCCH and EPDCCH interference is handled, on the basis of a subframe pattern or a subframe set configured in a higher layer for canceling CRS interference.

In the case of the PDSCH assistance information, the EPDCCH assistance information, and the CRS assistance information being configured in a higher layer, a method considered is such that the base station apparatus transmits the PDSCH assistance information and the EPDCCH assistance information by not including, in the PDSCH assistance information and the EPDCCH assistance information, information that is transmitted by the CRS assistance information. In the case of the PDSCH assistance information, the EPDCCH assistance information (includes the PDSCH assistance information in a part thereof), and the CRS assistance information being configured in a higher layer, a method considered is such that the base station apparatus transmits the EPDCCH assistance information by not including, in the EPDCCH assistance information, information that is transmitted by the CRS assistance information and the PDSCH assistance information. In the case of the PDSCH assistance information (includes the EPDCCH assistance information in a part thereof), the EPDCCH assistance information, and the CRS assistance information being configured in a higher layer, a method considered is such that the base station apparatus transmits the EPDSCH assistance information by not including, in the PDSCH assistance information, information that is transmitted by the CRS assistance information and the EPDCCH assistance information.

In the case of the PDSCH assistance information, the EPDCCH assistance information, and the CRS assistance information being configured in a higher layer, an index of the CRS assistance information included in the CRS assistance information list, an index of the PDSCH assistance information included in the PDSCH assistance information list, and an index of the EPDCCH assistance information included in the EPDCCH assistance information list can be associated in order to correlate the CRS assistance information, the PDSCH assistance information, and the EPDCCH assistance information.

For example, in the case of the CRS assistance information list including the CRS assistance information 1 and the CRS assistance information 2, the PDSCH assistance information list including the PDSCH assistance information 1 and the PDSCH assistance information 2, and the EPDCCH assistance information list including the EPDCCH assistance information 1 and the EPDCCH assistance information 2, the PDSCH assistance information 1, the EPDCCH assistance information 1, and the CRS assistance information 1 are associated, and the PDSCH assistance information 2, the EPDCCH assistance information 2, and the CRS assistance information 2 are associated. In this case, the terminal apparatus can handle PDSCH and EPDCCH interference on the basis of information included in the PDSCH assistance information 1, the EPDCCH assistance information 1, and the CRS assistance information 1. The number of pieces of CRS assistance information included in the CRS assistance information list, the number of pieces of PDSCH assistance information included in the PDSCH assistance information list, and the number of pieces of EPDCCH assistance information included in the EPDCCH assistance information list can be the same or different.

In order to correlate the PDSCH assistance information, the EPDCCH assistance information, and the CRS assistance information, cell ID can be included in the CRS assistance information, the PDSCH assistance information, and the EPDCCH assistance information. The terminal apparatus can detect the cell ID included in the PDSCH assistance information and/or the EPDCCH assistance information and acquire information related to CRS, that is, the number of CRS antenna ports and the MBSFN subframe configuration, from the CRS assistance information associated with the cell ID.

In addition, the terminal apparatus can detect the cell ID included in the EPDCCH assistance information and acquire information related to CRS and information related to PDSCH from the CRS assistance information and the PDSCH assistance information associated with the cell ID. Similarly, the terminal apparatus can detect the cell ID included in the PDSCH assistance information and acquire information related to CRS and information related to EPDCCH from the CRS assistance information and the EPDCCH assistance information associated with the cell ID.

In these cases, the terminal apparatus can cancel CRS interference on the basis of the PDSCH assistance information and/or the EPDCCH assistance information and the CRS assistance information and can handle a PDSCH and/or EPDCCH interference signal.

In the case of the CRS assistance information not being included in the PDSCH assistance information and the EPDCCH assistance information, the PDSCH assistance information and the EPDCCH assistance information can be transmitted only in the case of the base station apparatus transmitting the CRS assistance information. That is, the base station apparatus can configure the neighbor cell PDSCH information and/or the neighbor cell EPDCCH information only in the case of the neighbor cell CRS information being configured. Otherwise, the base station apparatus has to configure (turn ON) the neighbor cell CRS information in the case of the neighbor cell PDSCH information and/or the neighbor cell EPDCCH information being configured.

The terminal apparatus can determine a subframe in which PDSCH and EPDCCH interference is handled, on the basis of a subframe pattern or a subframe set configured in a higher layer for canceling CRS interference.

In the case of the PDCCH assistance information, the EPDCCH assistance information, and the PDSCH assistance information being configured in a higher layer, a method considered is such that the base station apparatus transmits the PDCCH assistance information and the EPDCCH assistance information by not including, in the PDDCH assistance information and the EPDCCH assistance information, information that is transmitted by the PDSCH assistance information. In the case of the PDCCH assistance information, the EPDCCH assistance information (includes the PDCCH assistance information in a part thereof), and the PDSCH assistance information being configured in a higher layer, a method considered is such that the base station apparatus transmits the EPDCCH assistance information by not including, in the EPDCCH assistance information, information that is transmitted by the PDSCH assistance information and the PDCCH assistance information. In the case of the PDCCH assistance information (includes the EPDCCH assistance information in a part thereof), the EPDCCH assistance information, and the PDSCH assistance information being configured in a higher layer, a method considered is such that the base station apparatus transmits the PDCCH assistance information by not including, in the PDCCH assistance information, information that is transmitted by the PDSCH assistance information and the EPDCCH assistance information.

In the case of the PDCCH assistance information, the EPDCCH assistance information, and the PDSCH assistance information being configured in a higher layer, an index of the PDSCH assistance information included in the PDSCH assistance information list, an index of the PDCCH assistance information included in the PDCCH assistance information list, and an index of the EPDCCH assistance information included in the EPDCCH assistance information list can be associated in order to correlate the PDSCH assistance information, the PDCCH assistance information, and the EPDCCH assistance information.

For example, in the case of the PDSCH assistance information list including the PDSCH assistance information 1 and the PDSCH assistance information 2, the PDCCH assistance information list including the PDCCH assistance information 1 and the PDCCH assistance information 2, and the EPDCCH assistance information list including the EPDCCH assistance information 1 and the EPDCCH assistance information 2, the PDCCH assistance information 1, the EPDCCH assistance information 1, and the PDSCH assistance information 1 are associated, and the PDCCH assistance information 2, the EPDCCH assistance information 2, and the PDSCH assistance information 2 are associated. In this case, the terminal apparatus can handle PDCCH and EPDCCH interference on the basis of information included in the PDCCH assistance information 1, the EPDCCH assistance information 1, and the PDSCH assistance information 1. The number of pieces of PDSCH assistance information included in the PDSCH assistance information list, the number of pieces of PDCCH assistance information included in the PDCCH assistance information list, and the number of pieces of EPDCCH assistance information included in the EPDCCH assistance information list can be the same or different.

In order to correlate the PDCCH assistance information, the EPDCCH assistance information, and the PDSCH assistance information, cell ID can be included in the PDSCH assistance information, the PDCCH assistance information, and the EPDCCH assistance information. The terminal apparatus can detect the cell ID included in the PDCCH assistance information and/or the EPDCCH assistance information and acquire information related to PDSCH from the PDSCH assistance information associated with the cell ID.

In addition, the terminal apparatus can detect the cell ID included in the EPDCCH assistance information and acquire information related to PDSCH and information related to PDCCH from the PDSCH assistance information and the PDCCH assistance information associated with the cell ID. Similarly, the terminal apparatus can detect the cell ID included in the PDCCH assistance information and acquire information related to PDSCH and information related to EPDCCH from the PDSCH assistance information and the EPDCCH assistance information associated with the cell ID.

In these cases, the terminal apparatus can cancel PDSCH interference on the basis of the PDCCH assistance information and/or the EPDCCH assistance information and the PDSCH assistance information and can handle a PDCCH and/or EPDCCH interference signal.

In the case of the PDSCH assistance information not being included in the PDCCH assistance information and the EPDCCH assistance information, the PDCCH assistance information and the EPDCCH assistance information can be transmitted only in the case of the base station apparatus transmitting the PDSCH assistance information. That is, the base station apparatus can configure the neighbor cell PDCCH information and/or the neighbor cell EPDCCH information only in the case of the neighbor cell PDSCH information being configured. Otherwise, the base station apparatus has to configure (turn ON) the neighbor cell PDSCH information in the case of the neighbor cell PDCCH information and/or the neighbor cell EPDCCH information being configured.

The higher layer in the transmission method for the PDCCH assistance information, the EPDCCH assistance information, and the PDSCH assistance information can be configured in the same manner even in the case of the PDCCH assistance information, the EPDCCH assistance information, and the PDSCH assistance information being substituted with one another.

In the case of the PDSCH assistance information, the PDCCH assistance information, the EPDCCH assistance information, and the CRS assistance information being configured in a higher layer, a method considered is such that the base station apparatus transmits the NAICS assistance information by not including, in the NAICS assistance information, information that is transmitted by the CRS assistance information. In order to correlate the CRS assistance information with the NAICS assistance information, an index of the CRS assistance information included in the CRS assistance information list can be associated with an index of the NAICS assistance information included in an NAICS assistance information list. For example, in the case of the CRS assistance information list including the CRS assistance information 1 and the CRS assistance information 2 and the NAICS assistance information list including NAICS assistance information 1 and NAICS assistance information 2, the NAICS assistance information 1 is associated with the CRS assistance information 1, and the NAICS assistance information 2 is associated with the CRS assistance information 2. In this case, the terminal apparatus can handle PDSCH, PDCCH, and EPDCCH interference on the basis of information included in the NAICS assistance information 1 and the CRS assistance information 1. The number of pieces of CRS assistance information included in the CRS assistance information list can be the same as or different from the number of pieces of NAICS assistance information included in the NAICS assistance information list.

In order to correlate the NAICS assistance information with the CRS assistance information, cell ID can be included in the CRS assistance information and the NAICS assistance information. That is, the terminal apparatus can detect the cell ID included in the NAICS assistance information and acquire information related to CRS, that is, the number of CRS antenna ports and the MBSFN subframe configuration, from the CRS assistance information associated with the cell ID. At this point, the terminal apparatus can cancel CRS interference and handle an NAICS interference signal on the basis of the NAICS assistance information and the CRS assistance information.

In the case of the NAICS assistance information not including the CRS assistance information, the NAICS assistance information can be transmitted only in the case of the base station apparatus transmitting the CRS assistance information. That is, the base station apparatus can configure neighbor cell NAICS information only in the case of the neighbor cell CRS information being configured. Otherwise, the base station apparatus has to configure (turn ON) the neighbor cell CRS information in the case of the neighbor cell NAICS information being configured.

The terminal apparatus can determine a subframe in which PDSCH, PDCCH, and EPDCCH interference is handled, on the basis of a subframe pattern or a subframe set configured in a higher layer for canceling CRS interference.

In the case of the PDCCH assistance information, the EPDCCH assistance information (includes the CRS assistance information and the PDSCH assistance information in a part thereof), the CRS assistance information, and the PDSCH assistance information being configured in a higher layer, a method considered is such that the base station apparatus transmits a PDCCH assistance information group by not including, in the PDCCH assistance information and the EPDCCH assistance information (called a PDCCH assistance information group or an NAICS assistance information group 2 as well), information that is transmitted by the CRS assistance information and the PDSCH assistance information (called a CRS assistance information group or an NAICS assistance information group 1 as well). In order to correlate the CRS assistance information group with the PDCCH assistance information group, an index of the CRS assistance information group included in a CRS assistance information group list can be associated with an index of the PDCCH assistance information group included in a PDCCH assistance information group list. For example, in the case of the CRS assistance information group including a CRS assistance information group 1 and a CRS assistance information group 2 and the PDCCH assistance information group list including a PDCCH assistance information group 1 and a PDCCH assistance information group 2, the PDCCH assistance information group 1 is associated with the CRS assistance information group 1, and the PDCCH assistance information group 2 is associated with the CRS assistance information group 2. In this case, the terminal apparatus can handle PDSCH, PDCCH, and EPDCCH interference on the basis of information included in the PDCCH assistance information group 1 and the CRS assistance information group 1. The number of CRS assistance information groups included in the CRS assistance information group list can be the same as or different from the number of PDCCH assistance information groups included in the PDCCH assistance information group list.

In order to correlate the PDCCH assistance information group with the CRS assistance information group, cell ID can be included in the CRS assistance information group and the PDCCH assistance information group. That is, the terminal apparatus can detect the cell ID included in the PDCCH assistance information group and acquire information related to CRS and information related to PDSCH from the CRS assistance information group associated with the cell ID. At this point, the terminal apparatus can cancel CRS interference and handle PDSCH, PDCCH, and EPDCCH interference signals on the basis of the PDCCH assistance information group and the CRS assistance information group.

In the case of the PDCCH assistance information group not including the CRS assistance information group, the PDCCH assistance information group can be transmitted only in the case of the base station apparatus transmitting the CRS assistance information group. That is, the base station apparatus can configure an neighbor cell PDCCH information group only in the case of an neighbor cell CRS information group being configured. Otherwise, the base station apparatus has to configure (turn ON) the neighbor cell CRS information group in the case of the neighbor cell PDCCH assistance information group being configured. While the PDSCH assistance information, the PDCCH assistance information, the EPDCCH assistance information, and the CRS assistance information are grouped into the PDCCH assistance information group and the CRS assistance information group above, the PDSCH assistance information, the PDCCH assistance information, the EPDCCH assistance information, and the CRS assistance information can be grouped into the PDSCH assistance information and the PDCCH assistance information and into the CRS assistance information and the EPDCCH assistance information.

In the case of the PDSCH assistance information being configured as the NAICS assistance information and the CRS assistance information not being configured in a higher layer, a method is considered to be such that the base station apparatus includes cell ID and information related to CRS in the PDSCH assistance information and transmits the PDSCH assistance information. The terminal apparatus, in the case of the PDSCH assistance information being configured and the CRS assistance information not being configured in a higher layer signal, can handle interference related to PDSCH on the basis of the PDSCH assistance information and cancel CRS interference on the basis of the information related to CRS that is included in the PDSCH assistance information. That is, in the case of the method that includes information related to CRS in the PDSCH assistance information and transmits the PDSCH assistance information, the base station apparatus may not transmit the CRS assistance information in the case of transmitting the PDSCH assistance information and may not transmit the PDSCH assistance information in the case of transmitting the CRS assistance information. That is, the base station apparatus can configure the neighbor cell PDSCH information only in the case of the neighbor cell CRS information not being configured. Otherwise, the base station apparatus does not configure (turns OFF) the neighbor cell CRS information in the case of the neighbor cell PDSCH information being configured.

The base station apparatus can include the same cell ID or different cell IDs for the cell ID included in the CRS assistance information and the cell ID included in the PDSCH assistance information.

In the case of the CRS assistance information being configured and the PDSCH assistance information not being configured in a higher layer, the terminal apparatus can cancel CRS interference on the basis of the CRS assistance information.

In the case of the PDSCH assistance information and the CRS assistance information being configured in a higher layer, the base station apparatus can configure the cell ID included in the PDSCH assistance information to be different from the cell ID included in the CRS assistance information. At this point, the terminal apparatus can handle CRS interference and PDSCH interference on the basis of information related to CRS configured in the PDSCH assistance information and can cancel CRS interference canceled on the basis of the PDSCH assistance information and, furthermore, CRS interference from another base station apparatus on the basis of the CRS assistance information.

In the case of the PDCCH assistance information being configured as the NAICS assistance information and the CRS assistance information not being configured in a higher layer, a method considered is such that the base station apparatus includes cell ID and information related to CRS in the PDCCH assistance information and transmits the PDCCH assistance information. The terminal apparatus, in the case of the PDCCH assistance information being configured and the CRS assistance information not being configured in a higher layer signal, can handle interference related to PDCCH on the basis of the PDCCH assistance information and cancel CRS interference on the basis of the information related to CRS that is included in the PDCCH assistance information. That is, in the case of the method that includes information related to CRS in the PDCCH assistance information and transmits the PDCCH assistance information, the base station apparatus may not transmit the CRS assistance information in the case of transmitting the PDCCH assistance information and may not transmit the PDCCH assistance information in the case of transmitting the CRS assistance information. That is, the base station apparatus can configure the neighbor cell PDCCH information only in the case of the neighbor cell CRS information not being configured. Otherwise, the base station apparatus does not configure (turns OFF) the neighbor cell CRS information in the case of the neighbor cell PDCCH information being configured.

The base station apparatus can include the same cell ID or different cell IDs for the cell ID included in the CRS assistance information and the cell ID included in the PDCCH assistance information.

In the case of the CRS assistance information being configured and the PDCCH assistance information not being configured in a higher layer, the terminal apparatus can cancel CRS interference on the basis of the CRS assistance information.

In the case of the PDCCH assistance information and the CRS assistance information being configured in a higher layer, the base station apparatus can configure the cell ID included in the PDCCH assistance information to be different from the cell ID included in the CRS assistance information. At this point, the terminal apparatus can handle CRS interference and PDCCH interference on the basis of information related to CRS configured in the PDCCH assistance information and can cancel CRS interference canceled on the basis of the PDCCH assistance information and, furthermore, CRS interference from another base station apparatus on the basis of the CRS assistance information.

In the case of the EPDCCH assistance information being configured as the NAICS assistance information and the CRS assistance information not being configured in a higher layer, a method considered is such that the base station apparatus includes cell ID and information related to CRS in the EPDCCH assistance information and transmits the EPDCCH assistance information. The terminal apparatus, in the case of the EPDCCH assistance information being configured and the CRS assistance information not being configured in a higher layer signal, can handle interference related to EPDCCH on the basis of the EPDCCH assistance information and cancel CRS interference on the basis of the information related to CRS that is included in the EPDCCH assistance information. That is, in the case of the method that includes information related to CRS in the EPDCCH assistance information and transmits the EPDCCH assistance information, the base station apparatus may not transmit the CRS assistance information in the case of transmitting the EPDCCH assistance information and may not transmit the EPDCCH assistance information in the case of transmitting the CRS assistance information. That is, the base station apparatus can configure the neighbor cell EPDCCH information only in the case of the neighbor cell CRS information not being configured. Otherwise, the base station apparatus does not configure (turns OFF) the neighbor cell CRS information in the case of the neighbor cell EPDCCH information being configured.

The base station apparatus can include the same cell ID or different cell IDs for the cell ID included in the CRS assistance information and the cell ID included in the EPDCCH assistance information.

In the case of the CRS assistance information being configured and the EPDCCH assistance information not being configured in a higher layer, the terminal apparatus can cancel CRS interference on the basis of the CRS assistance information.

In the case of the EPDCCH assistance information and the CRS assistance information being configured in a higher layer, the base station apparatus can configure the cell ID included in the EPDCCH assistance information to be different from the cell ID included in the CRS assistance information. At this point, the terminal apparatus can handle CRS interference and EPDCCH interference on the basis of information related to CRS configured in the EPDCCH assistance information and can cancel CRS interference canceled on the basis of the PDCCH assistance information and, furthermore, CRS interference from another base station apparatus on the basis of the CRS assistance information.

In the case of the PDCCH assistance information being configured as the NAICS assistance information and the PDSCH assistance information not being configured in a higher layer, a method considered is such that the base station apparatus includes cell ID and information related to PDSCH in the PDCCH assistance information and transmits the PDCCH assistance information. The terminal apparatus, in the case of the PDCCH assistance information being configured and the PDSCH assistance information not being configured in a higher layer signal, can handle interference related to PDCCH on the basis of the PDCCH assistance information and cancel PDSCH interference on the basis of the information related to PDSCH that is included in the PDCCH assistance information. That is, in the case of the method that includes information related to PDSCH in the PDCCH assistance information and transmits the PDCCH assistance information, the base station apparatus may not transmit the PDSCH assistance information in the case of transmitting the PDCCH assistance information and may not transmit the PDCCH assistance information in the case of transmitting the PDSCH assistance information. That is, the base station apparatus can configure the neighbor cell PDCCH information only in the case of the neighbor cell PDSCH information not being configured. Otherwise, the base station apparatus does not configure (turns OFF) the neighbor cell PDSCH information in the case of the neighbor cell PDCCH information being configured.

The base station apparatus can include the same cell ID or different cell IDs for the cell ID included in the PDSCH assistance information and the cell ID included in the PDCCH assistance information.

In the case of the PDSCH assistance information being configured and the PDCCH assistance information not being configured in a higher layer, the terminal apparatus can cancel PDSCH interference on the basis of the PDSCH assistance information.

In the case of the PDCCH assistance information and the PDSCH assistance information being configured in a higher layer, the base station apparatus can configure the cell ID included in the PDCCH assistance information to be different from the cell ID included in the PDSCH assistance information. At this point, the terminal apparatus can handle PDSCH interference and PDCCH interference on the basis of information related to PDSCH configured in the PDCCH assistance information and can cancel PDSCH interference canceled on the basis of the PDCCH assistance information and, furthermore, PDSCH interference from another base station apparatus on the basis of the PDSCH assistance information.

The higher layer in the transmission method for the PDSCH assistance information and the PDCCH assistance information can be configured in the same manner even if the PDSCH assistance information and the PDCCH assistance information are reversed.

A higher layer in a transmission method for the PDSCH assistance information and the EPDCCH assistance information can be configured in the same manner as in the transmission method for the PDSCH assistance information and the PDCCH assistance information.

A higher layer in a transmission method for the PDCCH assistance information and the EPDCCH assistance information can be configured in the same manner as in the transmission method for the PDSCH assistance information and the PDCCH assistance information.

In the case of the PDSCH assistance information and the PDCCH assistance information being configured as the NAICS assistance information and the CRS assistance information not being configured in a higher layer, a method considered is such that the base station apparatus includes cell ID and information related to CRS in the PDSCH assistance information and/or the PDCCH assistance information and transmits the PDSCH assistance information and/or the PDCCH assistance information. The terminal apparatus, in the case of the PDSCH assistance information and the PDCCH assistance information being configured and the CRS assistance information not being configured in a higher layer signal, can handle interference related to PDSCH and PDCCH on the basis of the PDSCH assistance information and the PDCCH assistance information and cancel CRS interference on the basis of the information related to CRS that is included in the PDSCH assistance information and/or the PDCCH assistance information. That is, in the case of the method that includes information related to CRS in the PDSCH assistance information and/or the PDCCH assistance information and transmits the PDSCH assistance information and/or the PDCCH assistance information, the base station apparatus may not transmit the CRS assistance information when transmitting the PDSCH assistance information and the PDCCH assistance information and may not transmit the PDSCH assistance information and/or the PDCCH assistance information in the case of transmitting the CRS assistance information. That is, the base station apparatus can configure the neighbor cell PDSCH assistance information and/or the PDCCH assistance information only in the case of the neighbor cell CRS information not being configured. Otherwise, the base station apparatus does not configure (turns OFF) the neighbor cell CRS information in the case of the neighbor cell PDSCH assistance information and/or the PDCCH assistance information being configured.

The base station apparatus can include the same cell ID or different cell IDs for the cell ID included in the CRS assistance information and the cell IDs included in the PDSCH assistance information and the PDCCH assistance information.

In the case of the CRS assistance information being configured and the PDSCH assistance information and the PDCCH assistance information not being configured in a higher layer, the terminal apparatus can cancel CRS interference on the basis of the CRS assistance information.

In the case of the PDCCH assistance information being configured as the NAICS assistance information and the CRS assistance information and the PDSCH assistance information not being configured in a higher layer, a method considered is such that the base station apparatus includes cell ID, information related to CRS, and information related to PDSCH in the PDCCH assistance information and transmits the PDCCH assistance information. The terminal apparatus, in the case of the PDCCH assistance information being configured and the CRS assistance information and the PDSCH assistance information not being configured in a higher layer signal, can handle interference related to PDCCH on the basis of the PDCCH assistance information and cancel CRS and PDSCH interference on the basis of the information related to CRS and the information related to PDSCH that are included in the PDCCH assistance information. That is, in the case of the method that includes information related to CRS and information related to PDSCH in the PDCCH assistance information and transmits the PDCCH assistance information, the base station apparatus may not transmit the CRS assistance information and the PDSCH assistance information in the case of transmitting the PDCCH assistance information and may not transmit the PDCCH assistance information in the case of transmitting the CRS assistance information and the PDSCH assistance information. That is, the base station apparatus can configure the PDCCH assistance information only in the case of the neighbor cell CRS information and the PDSCH information not being configured. Otherwise, the base station apparatus does not configure (turns OFF) the neighbor cell CRS information and the PDSCH information in the case of the neighbor cell PDCCH assistance information being configured.

The base station apparatus can include the same cell ID or different cell IDs for the cell ID included in the CRS assistance information and the cell IDs included in the PDSCH assistance information and the PDCCH assistance information.

In the case of the CRS assistance information and the PDSCH assistance information being configured and the PDCCH assistance information not being configured in a higher layer, the terminal apparatus can cancel CRS and PDSCH interference on the basis of the CRS assistance information and the PDSCH assistance information.

In the case of the PDSCH assistance information being configured as the NAICS assistance information and the CRS assistance information and the PDCCH assistance information not being configured in a higher layer, a method considered is such that the base station apparatus includes cell ID, information related to CRS, and information related to PDCCH in the PDCCH assistance information and transmits the PDCCH assistance information. The terminal apparatus, in the case of the PDSCH assistance information being configured and the CRS assistance information and the PDCCH assistance information not being configured in a higher layer signal, can handle interference related to PDSCH and cancel CRS and PDCCH interference on the basis of the information related to CRS and the information related to PDCCH that are included in the PDSCH assistance information. That is, in the case of the method that includes information related to CRS and information related to PDCCH in the PDSCH assistance information and transmits the PDSCH assistance information, the base station apparatus may not transmit the CRS assistance information and the PDCCH assistance information in the case of transmitting the PDSCH assistance information and may not transmit the PDSCH assistance information in the case of transmitting the CRS assistance information and the PDCCH assistance information. That is, the base station apparatus can configure the PDSCH assistance information only in the case of the neighbor cell CRS information and the PDCCH information not being configured. Otherwise, the base station apparatus does not configure (turns OFF) the neighbor cell CRS information and the PDCCH information in the case of the neighbor cell PDSCH assistance information being configured.

The base station apparatus can include the same cell ID or different cell IDs for the cell ID included in the CRS assistance information and the cell IDs included in the PDCCH assistance information and the PDSCH assistance information.

In the case of the CRS assistance information and the PDCCH assistance information being configured and the PDSCH assistance information not being configured in a higher layer, the terminal apparatus can cancel CRS and PDCCH interference on the basis of the CRS assistance information and the PDCCH assistance information.

In the case of the PDSCH assistance information, the PDCCH assistance information, and the CRS assistance information being configured in a higher layer, the base station apparatus can configure the cell ID included in the PDSCH assistance information and/or the PDCCH assistance information to be different from the cell ID included in the CRS assistance information. At this point, the terminal apparatus can handle CRS interference and PDSCH and PDCCH interference on the basis of information related to CRS configured in the PDSCH assistance information and/or the PDCCH assistance information and can cancel CRS interference canceled on the basis of the PDSCH assistance information and/or the PDCCH assistance information and, furthermore, CRS interference from another base station apparatus on the basis of the CRS assistance information.

The above "transmission method related to configuration of the PDSCH assistance information, the PDCCH assistance information, and the CRS assistance information" can be applied in the same manner to a "transmission method related to configuration of the PDCCH assistance information, the EPDCCH assistance information, and the CRS assistance information", a "transmission method related to configuration of the PDSCH assistance information, the EPDCCH assistance information, and the CRS assistance information", and a "transmission method related to configuration of the PDCCH assistance information, the EPDCCH assistance information, and the PDSCH assistance information".

In the case of the PDSCH assistance information, the PDCCH assistance information, and the EPDCCH assistance information being configured as the NAICS assistance information and the CRS assistance information not being configured in a higher layer, a method considered is such that the base station apparatus includes cell ID and information related to CRS in the NAICS assistance information and transmits the NAICS assistance information. The terminal apparatus, in the case of the NAICS assistance information being configured and the CRS assistance information not being configured in a higher layer signal, can handle interference related to NAICS on the basis of the NAICS assistance information and cancel CRS interference on the basis of the information related to CRS that is included in the NAICS assistance information. That is, in the case of the method that includes information related to CRS in the NAICS assistance information and transmits the NAICS assistance information, the base station apparatus may not transmit the CRS assistance information in the case of transmitting the NAICS assistance information and may not transmit the NAICS assistance information in the case of transmitting the CRS assistance information. That is, the base station apparatus can configure the neighbor cell NAICS information only in the case of the neighbor cell CRS information not being configured. Otherwise, the base station apparatus does not configure (turns OFF) the neighbor cell CRS information in the case of the neighbor cell NAICS information being configured.

The base station apparatus can include the same cell ID or different cell IDs for the cell ID included in the CRS assistance information and the cell ID included in the NAICS assistance information.

In the case of the CRS assistance information being configured and the NAICS assistance information not being configured in a higher layer, the terminal apparatus can cancel CRS interference on the basis of the CRS assistance information.

In the case of the PDSCH assistance information, the PDCCH assistance information, the EPDCCH assistance information, and the CRS assistance information being configured in a higher layer, the base station apparatus can configure the cell ID included in the NAICS assistance information to be different from the cell ID included in the CRS assistance information. At this point, the terminal apparatus can handle CRS interference and NAICS interference on the basis of information related to CRS configured in the NAICS assistance information and can cancel CRS interference canceled on the basis of the NAICS assistance information and, furthermore, CRS interference from another base station apparatus on the basis of the CRS assistance information.

In the case of the PDCCH assistance information group being configured as the NAICS assistance information and the CRS assistance information group not being configured in a higher layer, a method considered is such that the base station apparatus includes cell ID, information related to CRS, and information related to PDSCH in the PDCCH assistance information group and transmits the PDCCH assistance information group. The terminal apparatus, in the case of the PDCCH assistance information group being configured and the CRS assistance information group not being configured in a higher layer signal, can handle interference related to PDCCH and EPDCCH on the basis of the PDCCH assistance information group and cancel CRS and PDSCH interference on the basis of the information related to CRS and the information related to PDSCH that are included in the PDCCH assistance information group. That is, in the case of the method that includes information related to CRS and information related to PDSCH in the PDCCH assistance information group and transmits the PDCCH assistance information group, the base station apparatus may not transmit the CRS assistance information group in the case of transmitting the PDCCH assistance information group and may not transmit the PDCCH assistance information group in the case of transmitting the CRS assistance information group. That is, the base station apparatus can configure the neighbor cell PDCCH information group only in the case of the neighbor cell CRS information and the PDSCH information not being configured. Otherwise, the base station apparatus does not configure (turns OFF) the neighbor cell CRS information group in the case of the neighbor cell PDCCH information group being configured.

The base station apparatus can include the same cell ID or different cell IDs for the cell ID included in the CRS assistance information group and cell ID included in an NAICS assistance information group.

In the case of the CRS assistance information group being configured and the PDCCH assistance information group not being configured in a higher layer, the terminal apparatus can cancel CRS and PDSCH interference on the basis of the CRS assistance information group.

In the case of the PDCCH assistance information group and the CRS assistance information group being configured in a higher layer, the base station apparatus can configure the cell ID included in the PDCCH assistance information group to be different from the cell ID included in the CRS assistance information group. At this point, the terminal apparatus can handle CRS interference, PDSCH interference, PDCCH interference, and EPDSCH interference on the basis of information related to CRS and information related to PDSCH configured in the PDCCH assistance information group and can cancel CRS interference and PDSCH interference canceled on the basis of the PDCCH assistance information group and, furthermore, CRS interference and PDSCH interference from another base station apparatus on the basis of the CRS assistance information group. While the PDSCH assistance information, the PDCCH assistance information, the EPDCCH assistance information, and the CRS assistance information are grouped into the PDCCH assistance information group and the CRS assistance information group above, the PDSCH assistance information, the PDCCH assistance information, the EPDCCH assistance information, and the CRS assistance information can be grouped into the PDSCH assistance information and the PDCCH assistance information and into the CRS assistance information and the EPDCCH assistance information.

The scheduling unit 1012 determines a frequency and a subframe to which a physical channel (PDSCH and PUSCH) is assigned, a code rate and a modulation scheme (or MCS) for a physical channel (PDSCH and PUSCH), transmit power, and the like. The scheduling unit 1012 outputs determined information to the control unit 102.

The scheduling unit 1012 generates information used in scheduling of a physical channel (PDSCH and PUSCH) on the basis of a scheduling result. The scheduling unit 1012 outputs generated information to the control unit 102. In the present embodiment, the scheduling unit 1012, for example, schedules the terminal apparatus 2A and the terminal apparatus 2B in the same resource. While the same resource is used for simplification purposes in the present embodiment, the terminal apparatus 2A and the terminal apparatus 2B may be scheduled in different resources. Scheduling can also be performed in cooperation with the base station apparatus 1B.

The control unit 102, on the basis of information input from the higher layer processing unit 101, generates a control signal that controls the transmission unit 103 and the reception unit 104. The control unit 102 generates the downlink control information on the basis of information input from the higher layer processing unit 101 and outputs the downlink control information to the transmission unit 103.

The transmission unit 103, in accordance with the control signal input from the control unit 102, generates a downlink reference signal, codes and modulates the HARQ indicator, the downlink control information, and the downlink data input from the higher layer processing unit 101, multiplexes PHICH, PDCCH, EPDCCH, PDSCH, and the downlink reference signal, and transmits a signal to the terminal apparatus 2 through the transmit and receive antenna 105.

The coding unit 1031 codes the HARQ indicator, the downlink control information, and the downlink data input from the higher layer processing unit 101 by using a predetermined coding scheme such as block coding, convolutional coding, and turbo coding or by using a coding scheme determined by the radio resource control unit 1011. The modulation unit 1032 modulates a coding bit input from the coding unit 1031 by using a predetermined modulation scheme such as binary phase shift keying (BPSK), quadrature phase shift keying (QPSK), 16 quadrature amplitude modulation (QAM), 64QAM, and 256QAM or by using a modulation scheme determined by the radio resource control unit 1011.

The downlink reference signal generation unit 1033 generates a sequence as the downlink reference signal, the sequence being known by the terminal apparatus 2 and being obtained by using a rule predetermined on the basis of a physical cell identifier (PCI or cell ID) for identification of the base station apparatus 1A.

The multiplexing unit 1034 multiplexes a modulation symbol of each modulated channel and the generated downlink reference signal and the downlink control information. That is, the multiplexing unit 1034 arranges the modulation symbol of each modulated channel and the generated downlink reference signal and the downlink control information in a resource element.

The radio transmission unit 1035 performs an inverse fast Fourier transform (IFFT) of the multiplexed modulation symbol and the like to generate an OFDM symbol, adds a cyclic prefix (CP) to the OFDM symbol to generate a baseband digital signal, converts the baseband digital signal into an analog signal, removes an extraneous frequency component by filtering, converts the frequency of the analog signal up to a carrier frequency, amplifies the power of the analog signal, and outputs the analog signal to the transmit and receive antenna 105 to transmit the analog signal.

The reception unit 104, in accordance with the control signal input from the control unit 102, demultiplexes, demodulates, and decodes a receive signal received from the terminal apparatus 2 through the transmit and receive antenna 105 and outputs decoded information to the higher layer processing unit 101.

The radio reception unit 1041 converts an uplink signal received through the transmit and receive antenna 105 into a baseband signal by downconversion, removes an unnecessary frequency component, controls an amplification level to appropriately maintain a signal level, performs quadrature demodulation on the basis of an in-phase component and a quadrature component of the received signal, and converts the quadrature demodulated analog signal into a digital signal.

The radio reception unit 1041 removes a component corresponding to CP from the converted digital signal. The radio reception unit 1041 performs a fast Fourier transform (FFT) of the signal from which CP is removed, and extracts and outputs a frequency domain signal to the demultiplexing portion 1042.

The demultiplexing portion 1042 demultiplexes the signal input from the radio reception unit 1041 into signals such as PUCCH, PUSCH, and an uplink reference signal. This demultiplexing is performed on the basis of radio resource assignment information included in uplink grant that the base station apparatus 1A determines in advance by using the radio resource control unit 1011 and notifies to each terminal apparatus 2.

In addition, the demultiplexing portion 1042 compensates the propagation channels of PUCCH and PUSCH. In addition, the demultiplexing portion 1042 demultiplexes the uplink reference signal.

The demodulation unit 1043 performs an inverse discrete Fourier transform (IDFT) of PUSCH, acquires the modulation symbol, and demodulates the receive signal for each modulation symbol of PUCCH and PUSCH by using a predetermined modulation scheme such as BPSK, QPSK, 16QAM, 64QAM, and 256QAM or by using a modulation scheme that the base station apparatus 1A notifies in advance to each terminal apparatus 2 by using the uplink grant.

The decoding unit 1044 decodes a demodulated coding bit of PUCCH and PUSCH at a predetermined code rate of a predetermined coding scheme or at a predetermined code rate that the base station apparatus 1A notifies in advance to the terminal apparatus 2 by using the uplink grant, and outputs the decoded uplink data and the uplink control information to the higher layer processing unit 101. In the case of retransmitting PUSCH, the decoding unit 1044 performs decoding by using the demodulated coding bit and a coding bit retained in an HARQ buffer input from the higher layer processing unit 101.

FIG. 3 is a schematic block diagram illustrating composition of the terminal apparatus 2 in the present embodiment. As illustrated in FIG. 3, the terminal apparatus 2 is constituted to include a higher layer processing unit 201, a control unit 202, a transmission unit 203, a reception unit 204, a channel state information generating unit 205, and a transmit and receive antenna 206. The higher layer processing unit 201 is constituted to include a radio resource control unit 2011 and a scheduling information analysis unit 2012. The transmission unit 203 is constituted to include a coding unit 2031, a modulation unit 2032, an uplink reference signal generation unit 2033, a multiplexing unit 2034, and a radio transmission unit 2035. The reception unit 204 is constituted to include a radio reception unit 2041, a demultiplexing portion 2042, and a signal detection unit 2043.

The higher layer processing unit 201 outputs uplink data (transport block) generated by a user operation or the like to the transmission unit 203. In addition, the higher layer processing unit 201 performs processing in a medium access control (MAC) layer, a packet data convergence protocol (PDCP) layer, a radio link control (RLC) layer, and a radio resource control (RRC) layer.

The radio resource control unit 2011 manages various types of configuration information as to the terminal apparatus. In addition, the radio resource control unit 2011 generates information that is arranged in each uplink channel, and outputs the information to the transmission unit 203.

The radio resource control unit 2011 acquires configuration information related to CSI feedback transmitted from the base station apparatus and outputs the configuration information to the control unit 202.

The scheduling information analysis unit 2012 analyzes the downlink control information received through the reception unit 204 and determines scheduling information. In addition, the scheduling information analysis unit 2012, on the basis of the scheduling information, generates control information for controlling the reception unit 204 and the transmission unit 203 and outputs the control information to the control unit 202.

The control unit 202, on the basis of information input from the higher layer processing unit 201, generates a control signal that controls the reception unit 204, the channel state information generating unit 205, and the transmission unit 203. The control unit 202 outputs the generated control signal to the reception unit 204, the channel state information generating unit 205, and the transmission unit 203 to control the reception unit 204 and the transmission unit 203.

The control unit 202 controls the transmission unit 203 to transmit CSI generated by the channel state information generating unit 205 to the base station apparatus.

The reception unit 204, in accordance with the control signal input from the control unit 202, demultiplexes, demodulates, and decodes a receive signal received from the base station apparatus 1A through the transmit and receive antenna 206 and outputs decoded information to the higher layer processing unit 201. The reception unit 204 receives a reference signal corresponding to the base station apparatus 1A (called a first reference signal as well) included in the receive signal and a reference signal based on interference information configured from the base station apparatus 1A (called a second reference signal as well) and outputs the reference signals to the channel state information generating unit 205.

The radio reception unit 2041 converts a downlink signal received through the transmit and receive antenna 206 into a baseband signal by downconversion, removes an unnecessary frequency component, controls an amplification level to appropriately maintain a signal level, performs quadrature demodulation on the basis of an in-phase component and a quadrature component of the received signal, and converts the quadrature demodulated analog signal into a digital signal.

In addition, the radio reception unit 2041 removes a part corresponding to CP from the converted digital signal, performs a fast Fourier transform of the signal from which CP is removed, and extracts a frequency domain signal.

The demultiplexing portion 2042 demultiplexes the extracted signal into PHICH, PDCCH, EPDCCH, PDSCH, and a downlink reference signal. In addition, the demultiplexing portion 2042, on the basis of a channel estimation value of a desired signal acquired from channel measurement, compensates channels of PHICH, PDCCH, and EPDCCH and detects and outputs the downlink control information to the control unit 202. The control unit 202 outputs PDSCH and the channel estimation value of the desired signal to the signal detection unit 2043.

The signal detection unit 2043 detects a signal by using PDSCH and the channel estimation value and outputs the signal to the higher layer processing unit 201. In the case of at least one of the PDSCH assistance information, the PDCCH assistance information, the EPDCCH assistance information, and the CRS assistance information being configured in a higher layer, an interference signal is canceled or suppressed to detect a signal. To cancel or suppress an interference signal, for example, linear detection that considers a channel estimation value of the interference signal, or interference cancellation or maximum likelihood detection that considers a channel estimation value of the interference signal or a modulation scheme is performed.

The signal detection unit 2043, in the case of the PDSCH assistance information and the CRS assistance information being configured in a higher layer, detects a parameter required for estimation of an interference channel and/or demodulation of an interference signal on the basis of the PDSCH assistance information and the CRS assistance information associated with the cell ID included in the PDSCH assistance information. For a parameter having a plurality of values configured in the PDSCH assistance information, blind detection of a value configured in an interference signal is performed with the plurality of values as candidates. For a parameter that is not configured in the PDSCH assistance information and the CRS assistance information, blind detection of a value configured in an interference signal is performed with a value that is likely to be configured in the system as a candidate. The signal detection unit 2043 can cancel or suppress PDSCH interference by using the detected parameter. In addition, CRS interference can be canceled on the basis of the CRS assistance information.

The signal detection unit 2043, in the case of the PDSCH assistance information being configured and the CRS assistance information not being configured in a higher layer, detects a parameter required for channel estimation of an interference signal and/or demodulation of an interference signal on the basis of the PDSCH assistance information. For a parameter having a plurality of values configured in the PDSCH assistance information, blind detection of a value configured in an interference signal is performed with the plurality of values as candidates. For a parameter that is not configured in the PDSCH assistance information, blind detection is performed. Even in the case of the CRS assistance information not being configured, CRS interference is canceled on the basis of information related to CRS that is included in the PDSCH assistance information.

The signal detection unit 2043, in the case of the CRS assistance information being configured and the PDSCH assistance information not being configured in a higher layer, does not cancel or suppress PDSCH interference and cancels CRS interference on the basis of the CRS assistance information.

The signal detection unit 2043 can apply the "interference cancellation process according to whether or not the PDSCH assistance information and the CRS assistance information are configured" in the same manner to an "interference cancellation process based on configuration of the PDCCH assistance information and the CRS assistance information" and an "interference cancellation process based on configuration of the EPDCCH assistance information and the CRS assistance information".

The signal detection unit 2043, in the case of the PDCCH assistance information and the PDSCH assistance information being configured in a higher layer, detects a parameter required for estimation of an interference channel and/or demodulation of an interference signal on the basis of the PDCCH assistance information and the PDSCH assistance information associated with the cell ID included in the PDCCH assistance information. For a parameter having a plurality of values configured in the PDCCH assistance information, blind detection of a value configured in an interference signal is performed with the plurality of values as candidates. For a parameter that is not configured in the PDCCH assistance information and the PDSCH assistance information, blind detection of a value configured in an interference signal is performed with a value that is likely to be configured in the system as a candidate. The signal detection unit 2043 can cancel or suppress PDCCH interference by using the detected parameter. In addition, PDSCH interference can be canceled on the basis of the PDSCH assistance information.

The signal detection unit 2043, in the case of the PDCCH assistance information being configured and the PDSCH assistance information not being configured in a higher layer, detects a parameter required for channel estimation of an interference signal and/or demodulation of an interference signal on the basis of the PDCCH assistance information. For a parameter having a plurality of values configured in the PDCCH assistance information, blind detection of a value configured in an interference signal is performed with the plurality of values as candidates. For a parameter that is not configured in the PDCCH assistance information, blind detection is performed. Even in the case of the PDSCH assistance information not being configured, CRS interference is canceled on the basis of information related to PDSCH that is included in the PDCCH assistance information.

The signal detection unit 2043, in the case of the PDSCH assistance information being configured and the PDCCH assistance information not being configured in a higher layer, does not cancel or suppress PDCCH interference and cancels PDSCH interference on the basis of the PDSCH assistance information.

The signal detection unit 2043 can apply the "interference cancellation process according to whether or not the PDCCH assistance information and the PDSCH assistance information are configured" in the same manner even if the PDCCH assistance information and the PDSCH assistance information are substituted with each other.

The signal detection unit 2043, in the case of the PDSCH assistance information, the PDCCH assistance information, and the CRS assistance information being configured in a higher layer, detects a parameter required for estimation of an interference channel and/or demodulation of an interference signal on the basis of the PDSCH assistance information and/or the PDSCH assistance information and the PDSCH assistance information and/or the CRS assistance information associated with the cell ID included in the PDSCH assistance information. For a parameter having a plurality of values configured in the PDSCH assistance information and/or the PDSCH assistance information, blind detection of a value configured in an interference signal is performed with the plurality of values as candidates. For a parameter that is not configured in the PDSCH assistance information, the PDSCH assistance information, and the CRS assistance information, blind detection of a value configured in an interference signal is performed with a value that is likely to be configured in the system as a candidate. The signal detection unit 2043 can cancel or suppress PDSCH and PDCCH interference by using the detected parameter. In addition, CRS interference can be canceled on the basis of the CRS assistance information.

The signal detection unit 2043, in the case of the PDSCH assistance information and the PDCCH assistance information being configured and the CRS assistance information not being configured in a higher layer, detects a parameter required for channel estimation of an interference signal and/or demodulation of an interference signal on the basis of the PDSCH assistance information and the PDCCH assistance information. For a parameter having a plurality of values configured in the PDSCH assistance information and the PDCCH assistance information, blind detection of a value configured in an interference signal is performed with the plurality of values as candidates. For a parameter that is not configured in the PDSCH assistance information and/or the PDCCH assistance information, blind detection is performed. Even in the case of the CRS assistance information not being configured, CRS interference is canceled on the basis of information related to CRS that is included in the PDSCH assistance information and/or the PDCCH assistance information.

The signal detection unit 2043, in the case of the CRS assistance information being configured and the PDSCH assistance information and the PDCCH assistance information not being configured in a higher layer, does not cancel or suppress PDSCH and PDCCH interference and cancels CRS interference on the basis of the CRS assistance information.

The signal detection unit 2043, in the case of the PDCCH assistance information being configured and the PDSCH assistance information and the CRS assistance information not being configured in a higher layer, detects a parameter required for channel estimation of an interference signal and/or demodulation of an interference signal on the basis of the PDCCH assistance information. For a parameter having a plurality of values configured in the PDCCH assistance information, blind detection of a value configured in an interference signal is performed with the plurality of values as candidates. For a parameter that is not configured in the PDCCH assistance information, blind detection is performed. Even in the case of the PDSCH assistance information and the CRS assistance information not being configured, CRS interference and PDSCH interference are canceled on the basis of information related to CRS and information related to PDSCH that are included in the PDCCH assistance information.

The signal detection unit 2043, in the case of the PDSCH assistance information and the CRS assistance information being configured and the PDCCH assistance information not being configured in a higher layer, does not cancel or suppress PDCCH interference and cancels PDSCH interference and CRS interference on the basis of the PDSCH assistance information and the CRS assistance information.

The signal detection unit 2043, in the case of the PDSCH assistance information being configured and the PDCCH assistance information and the CRS assistance information not being configured in a higher layer, detects a parameter required for channel estimation of an interference signal and/or demodulation of an interference signal on the basis of the PDSCH assistance information. For a parameter having a plurality of values configured in the PDSCH assistance information, blind detection of a value configured in an interference signal is performed with the plurality of values as candidates. For a parameter that is not configured in the PDSCH assistance information, blind detection is performed. Even in the case of the PDCCH assistance information and the CRS assistance information not being configured, CRS interference and PDCCH interference are canceled on the basis of information related to CRS and information related to PDCCH that are included in the PDSCH assistance information.

The signal detection unit 2043, in the case of the PDCCH assistance information and the CRS assistance information being configured and the PDSCH assistance information not being configured in a higher layer, does not cancel or suppress PDSCH interference and cancels PDCCH interference and CRS interference on the basis of the PDCCH assistance information and the CRS assistance information.

The signal detection unit 2043 can apply the "interference cancellation process according to whether or not the PDSCH assistance information, the PDCCH assistance information, and the CRS assistance information are configured" in the same manner to an "interference cancellation process according to whether or not the PDCCH assistance information, the EPDCCH assistance information, and the CRS assistance information are configured", an "interference cancellation process based on configuration of the PDSCH assistance information, the EPDCCH assistance information, and the CRS assistance information", and an "interference cancellation process based on configuration of the PDSCH assistance information, the PDCCH assistance information, and the EPDCCH assistance information".

The signal detection unit 2043, in the case of the PDSCH assistance information, the PDCCH assistance information, and the EPDCCH assistance information being configured as the NAICS assistance information and the CRS assistance information being configured in a higher layer, detects a parameter required for estimation of an interference channel and/or demodulation of an interference signal on the basis of the CRS assistance information associated with the cell ID included in any NAICS assistance information. For a parameter having a plurality of values configured in the NAICS assistance information, blind detection of a value configured in an interference signal is performed with the plurality of values as candidates. For a parameter that is not configured in the NAICS assistance information and the CRS assistance information, blind detection of a value configured in an interference signal is performed with a value that is likely to be configured in the system as a candidate. The signal detection unit 2043 can cancel or suppress PDSCH, PDCCH, and EPDCCH interference by using the detected parameter. In addition, CRS interference can be canceled on the basis of the CRS assistance information.

The signal detection unit 2043, in the case of the PDSCH assistance information, the PDCCH assistance information, and the EPDCCH assistance information being configured as the NAICS assistance information and the CRS assistance information not being configured in a higher layer, detects a parameter required for channel estimation of an interference signal and/or demodulation of an interference signal on the basis of the NAICS assistance information. For a parameter having a plurality of values configured in the NAICS assistance information, blind detection of a value configured in an interference signal is performed with the plurality of values as candidates. For a parameter that is not configured in the NAICS assistance information, blind detection is performed. Even in the case of the CRS assistance information not being configured, CRS interference is canceled on the basis of information related to CRS that is included in any NAICS assistance information.

The signal detection unit 2043, in the case of the CRS assistance information being configured and the PDSCH assistance information, the PDCCH assistance information, and the EPDCCH assistance information not being configured in a higher layer, cancels only CRS interference on the basis of the CRS assistance information.

The signal detection unit 2043, in the case of the PDCCH and EPDSCH assistance information (includes the CRS assistance information and the PDSCH assistance information in a part thereof) being configured and the PDSCH and CRS assistance information not being configured in a higher layer, detects a parameter required for channel estimation of an interference signal and/or demodulation of an interference signal on the basis of the PDCCH assistance information and the EPDSCH assistance information (PDCCH assistance information group). For a parameter having a plurality of values configured in the PDCCH assistance information group, blind detection of a value configured in an interference signal is performed with the plurality of values as candidates. For a parameter that is not configured in the PDCCH assistance information group, blind detection is performed. Even in the case of the CRS assistance information and/or the PDSCH assistance information not being configured, CRS interference is canceled on the basis of information related to CRS that is included in any of the PDCCH assistance information group.

The signal detection unit 2043, in the case of the CRS assistance information being configured and the PDCCH assistance information group not being configured in a higher layer, cancels only CRS interference on the basis of the CRS assistance information. While the PDSCH assistance information, the PDCCH assistance information, the EPDCCH assistance information, and the CRS assistance information are grouped into the PDCCH assistance information group and the CRS assistance information group above, the PDSCH assistance information, the PDCCH assistance information, the EPDCCH assistance information, and the CRS assistance information can be grouped into the PDSCH assistance information and the PDCCH assistance information and into the CRS assistance information and the EPDCCH assistance information.

As described above, the PDSCH assistance information, the PDCCH assistance information, and the EPDCCH assistance information can be included as the NAICS assistance information. The signal detection unit 2043 can detect a signal without assuming assistance information not included in the NAICS assistance information. For example, in the case of the PDSCH assistance information and the PDCCH assistance information being included as the NAICS assistance information, the signal detection unit 2043 can cancel interference without assuming the EPDCCH assistance information not included in the NAICS assistance information.

The transmission unit 203, in accordance with the control signal input from the control unit 202, generates an uplink reference signal, codes and modulates the uplink data (transport block) input from the higher layer processing unit 201, and multiplexes and transmits PUCCH, PUSCH, and the generated uplink reference signal to the base station apparatus 1A through the transmit and receive antenna 206.

The coding unit 2031 codes the uplink control information input from the higher layer processing unit 201 by using convolutional coding, block coding, or the like. In addition, the coding unit 2031 performs turbo coding that is based on information used in scheduling of PUSCH.

The modulation unit 2032 modulates a coding bit input from the coding unit 2031 by using a modulation scheme such as BPSK, QPSK, 16QAM, and 64QAM notified by using the downlink control information or by using a modulation scheme that is predetermined for each channel.

The uplink reference signal generation unit 2033 generates a sequence that is obtained by a predetermined rule (formula), on the basis of a physical cell identifier (referred to as a physical cell identity, PCI, cell ID, or the like) for identification of the base station apparatus 1A, a bandwidth in which the uplink reference signal is arranged, a cyclic shift notified by using the uplink grant, the value of a parameter for generation of a DMRS sequence, and the like.

The multiplexing unit 2034, in accordance with the control signal input from the control unit 202, performs a discrete Fourier transform (DFT) after arranging modulation symbols of PUSCH in parallel. In addition, the multiplexing unit 2034 multiplexes signals of PUCCH and PUSCH and the generated uplink reference signal for each transmit antenna port. That is, the multiplexing unit 2034 arranges signals of PUCCH and PUSCH and the generated uplink reference signal in a resource element for each transmit antenna port.

The radio transmission unit 2035 performs an inverse fast Fourier transform (IFFT) of the multiplexed signal, performs SC-FDMA modulation, generates an SC-FDMA symbol, adds CP to the generated SC-FDMA symbol, generates a baseband digital signal, converts the baseband digital signal into an analog signal, removes an extraneous frequency component, converts the frequency of the analog signal to a carrier frequency by upconversion, amplifies the power of the analog signal, and outputs the analog signal to the transmit and receive antenna 206 to transmit the analog signal.

A program that operates in the base station apparatus and the terminal apparatus according to the present invention is a program (a program that causes a computer to function) that controls a CPU and the like in order to realize the function of the above embodiment according to the present invention. Information that is handled by these apparatuses is temporarily accumulated in a RAM when being processed and then is stored in various ROMs or HDDs, and the CPU reads, modifies, or writes the information if necessary. A recording medium storing the program may be any of a semiconductor medium (for example, a ROM or a non-volatile memory card), an optical recording medium (for example, a DVD, an MO, an MD, a CD, or a BD), a magnetic recording medium (for example, a magnetic tape or a flexible disk), and the like. The function of the above embodiment is not realized only by execution of the loaded program. The function of the present invention may be realized by processing of the program along with an operating system, another application program, or the like on the basis of instructions of the program.

In the case of distributing the program in the market, the program can be distributed by being stored in a portable recording medium or can be transferred to a server computer that is connected through a network such as the Internet. In this case, the present invention includes a storage apparatus of the server computer as well. A part or the entirety of the terminal apparatus and the base station apparatus in the above embodiment may be typically realized as LSI that is an integrated circuit. Each functional block of the reception apparatus may be configured as an individual chip, or a part or the entire functional blocks may be integrated into a chip. In the case of configuring each functional block as integrated circuits, an integrated circuit control unit that controls the integrated circuits is added.

A technique for the circuit integration is not limited to LSI and may be realized by a dedicated circuit or a general-purpose processor. In the case of emergence of a circuit integration technology that replaces LSI, due to advancement of semiconductor technology, an integrated circuit made by the technology can be used.

The present invention is not limited to the above embodiment. Application of the terminal apparatus of the present invention is not limited to a mobile station apparatus. Apparently, the terminal apparatus can be applied to a stationary type or non-movable type electronic apparatus installed indoors or outdoors, such as an AV apparatus, a kitchen apparatus, a cleaning or washing machine, an air conditioner, an office apparatus, a vending machine, and other daily life apparatuses.

While the embodiment of the invention is heretofore described in detail with reference to the drawings, specific composition of the invention is not limited to the embodiment. Designs and the like that are made to the extent not departing from the gist of the invention are also included in the claims.

INDUSTRIAL APPLICABILITY

The present invention is preferably used for a base station apparatus, a terminal apparatus, and an integrated circuit.

REFERENCE SIGNS LIST 1A, 1B BASE STATION APPARATUS
2A, 2B, 2C TERMINAL APPARATUS
101 HIGHER LAYER PROCESSING UNIT
102 CONTROL UNIT
103 TRANSMISSION UNIT
104 RECEPTION UNIT
105 TRANSMIT AND RECEIVE ANTENNA
1011 RADIO RESOURCE CONTROL UNIT
1012 SCHEDULING UNIT
1031 CODING UNIT
1032 MODULATION UNIT
1033 DOWNLINK REFERENCE SIGNAL GENERATION UNIT
1034 MULTIPLEXING UNIT
1035 RADIO TRANSMISSION UNIT
1041 RADIO RECEPTION UNIT
1042 DEMULTIPLEXING PORTION
1043 DEMODULATION UNIT
1044 DECODING UNIT

201 HIGHER LAYER PROCESSING UNIT
202 CONTROL UNIT
203 TRANSMISSION UNIT
204 RECEPTION UNIT
205 CHANNEL STATE INFORMATION GENERATING UNIT
206 TRANSMIT AND RECEIVE ANTENNA
2011 RADIO RESOURCE CONTROL UNIT
2012 SCHEDULING INFORMATION ANALYSIS UNIT
2031 CODING UNIT
2032 MODULATION UNIT
2033 UPLINK REFERENCE SIGNAL GENERATION UNIT
2034 MULTIPLEXING UNIT
2035 RADIO TRANSMISSION UNIT
2041 RADIO RECEPTION UNIT
2042 DEMULTIPLEXING PORTION
2043 SIGNAL DETECTION UNIT

The invention claimed is:

1. A base station apparatus that communicates with one or more terminal apparatuses in a certain cell, the base station apparatus comprising:
a transmission circuit configured and/or programmed to:
selectively transmit first information, second information and third information, at least one of the first information, second information or third information being transmitted to a one of the terminal apparatuses,
wherein at least the first information and the second information are different information related to neighboring cells, and, when transmitted to a terminal apparatus, are used by the terminal apparatus to mitigate interference from the neighboring cells;
the third information includes information related to a UL/DL configuration; and
the transmission circuit does not transmit the first information and the second information to the terminal apparatus in a case where the third information is configured by the base station apparatus.

2. The base station apparatus according to claim 1, comprising:
a reception circuit configured and/or programmed to:
receive, from the terminal apparatus, information indicating whether or not to support interference handling caused by neighboring cells by using the first information, and information indicating whether or not to support mitigating interference caused by neighboring cells by using the second information.

3. The base station apparatus according to claim 1, wherein the third information includes information related to a configuration of MBSFN Multimedia Broadcast multicast service Single Frequency Network (MBSFN) subframes.

4. The base station apparatus according to claim 1, wherein the first information includes information related to a physical cell ID, information related to a number of antenna ports of a cell-specific reference signal (CRS) and information related to the MBSFN subframes; and
the second information includes at least information related to the physical cell ID and information related to the number of antenna ports of CRS.

5. The base station apparatus according to claim 1, wherein the transmission circuit transmits the second information in a case where the third information is not configured and the first information is not configured.

6. A terminal apparatus that communicates with a base station apparatus in a certain cell, the terminal apparatus comprising:
a reception circuit configured and/or programmed to:
receive first information, second information and third information from the base station apparatus, the terminal apparatus receiving one or more of the first information, second information or third information from the base station at any one time,
wherein at least the first information and the second information are different information related to neighboring cells, and, when received, are used by the terminal apparatus to mitigate interference from the neighboring cells;
the third information includes information related to a UL/DL configuration; and
the reception circuit does not use the first information and the second information in a case where the third information is configured by the base station apparatus and received by the reception circuit.

7. The terminal apparatus according to claim 6, wherein the reception circuit receives the second information in a case where the third information is not configured by the base station apparatus and the first information is not configured by the base station apparatus.

8. The terminal apparatus according to claim 6, wherein the reception circuit detects a downlink control channel using the second information.

9. A communication method of a base station apparatus that communicates with one or more terminal apparatuses in a certain cell, the method comprising
selectively transmitting first information, second information and third information, at least one of the first information, second information or third information being transmitted to a one of the terminal apparatuses,
wherein at least the first information and the second information are different information related to neighboring cells, and, when transmitted to the terminal apparatus, are used by the terminal apparatus to mitigate interference from the neighboring cells;
the third information includes information related to a UL/DL configuration; and
the transmission step does not transmit the first information and the second information to the terminal apparatus in a case where the third information is configured by the base station apparatus.

10. A communication method of a terminal apparatus that communicates with a base station apparatus in a certain cell, the method comprising
the terminal apparatus being configured to receive first information, second information and third information from the base station apparatus, the terminal apparatus receiving one or more of the first information, second information and third information,
wherein at least the first information and the second information are different information related to neighboring cells, and are used by the terminal apparatus to mitigate interference from the neighboring cells;
the third information includes information related to a UL/DL configuration; and
the reception step does not use the first information and the second information in a case where the third information is configured by the base station apparatus and received by the terminal apparatus.

* * * * *